(12) United States Patent
Ishizuka et al.

(10) Patent No.: US 7,773,313 B2
(45) Date of Patent: Aug. 10, 2010

(54) CAM MECHANISM OF A RETRACTABLE ZOOM LENS

(75) Inventors: Kazunori Ishizuka, Kanagawa (JP); Toshiharu Suzuki, Saitama (JP); Makio Oishi, Tokyo (JP); Koto Miya, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/363,993

(22) Filed: Feb. 2, 2009

(65) Prior Publication Data

US 2009/0195891 A1 Aug. 6, 2009

(30) Foreign Application Priority Data

Feb. 4, 2008 (JP) .............................. 2008-023517

(51) Int. Cl.
G02B 15/14 (2006.01)

(52) U.S. Cl. ....................................................... 359/700

(58) Field of Classification Search ......... 359/699–701, 359/694; 396/79, 76; 348/240.99–240.3
See application file for complete search history.

(56) References Cited

U.S. PATENT DOCUMENTS

| 7,039,308 | B2 | 5/2006 | Nomura |
| 7,167,644 | B2 * | 1/2007 | Nomura ........................ 396/73 |
| 7,289,725 | B2 * | 10/2007 | Nomura ...................... 359/699 |
| 7,394,600 | B2 | 7/2008 | Yasutomi et al. |
| 2006/0045503 | A1 | 3/2006 | Ishizuka et al. |
| 2006/0045516 | A1 | 3/2006 | Ishizuka et al. |
| 2006/0056079 | A1 | 3/2006 | Ishizuka et al. |
| 2007/0253689 | A1 | 11/2007 | Nagai et al. |
| 2008/0019685 | A1 | 1/2008 | Ishizuka et al. |

* cited by examiner

*Primary Examiner*—Darryl J Collins
*Assistant Examiner*—Zachary Wilkes
(74) *Attorney, Agent, or Firm*—Greenblum & Bernstein P.L.C.

(57) ABSTRACT

A cam mechanism includes a cam ring having front and rear cam grooves which have a common reference cam diagram and are formed so that a front part of the front cam groove and a rear part of the rear cam groove are omitted from the reference cam diagram. A normal-width section and a wide-width section are provided in each of the front and rear cam grooves. In a zoom range, an associated cam follower of a driven member is engaged in the normal-width section of one of the front and rear cam grooves, and another associated cam follower of the driven member is positioned out of the other of the front and rear cam grooves. In a transition state between the zoom range and an accommodated position, both of the associated cam followers are positioned out of the normal-width sections of the respective front and rear cam grooves.

12 Claims, 16 Drawing Sheets

CAM MECHANISM OF A RETRACTABLE ZOOM LENS

BACKGROUND OF THE INVENTION

1. Field of the Invention

The present invention relates to a cam mechanism which is incorporated in a retractable zoom lens (lens barrel).

2. Description of the Related Art

The assignee of the present invention has proposed an advancing/retracting movement guide mechanism in U.S. Pat. No. 7,039,308, wherein the advancing/retracting movement guide mechanism has a structure making it possible to achieve a reduction in length of a cam ring in an optical axis direction without sacrificing the range of movement of each lens group or the like provided as a driven member in a lens barrel. This cam mechanism is characterized in that a plurality of cam grooves which trace substantially the same reference cam diagram are formed on the cam ring at different positions at least in the optical axis direction, that all cam grooves of the plurality of cam grooves are formed as partial cam grooves each having at least one end opening at least one of the opposite ends of the cam ring, so as not to include an entire portion of the reference cam diagram, that a plurality of cam followers are formed on a linearly movable ring at different positions at least in the optical axis direction to be respectively engageable in the cam grooves, and that at least one of the cam followers remains engaged in the associated cam groove while at least one of the other of the cam followers comes out of the end opening and is disengaged therefrom when the linearly movable frame moves to a movement limit thereof in the optical axis direction.

In a cam mechanism incorporated in a lens barrel, it is often the case that a plurality of cam grooves and a corresponding plurality of cam followers are provided at different positions in a circumferential direction about a photographing optical axis in order to secure stability. For example, if each of three cam grooves which are formed on a cam ring at three different positions in a circumferential direction is composed of two partial cam grooves, i.e., a front partial cam groove and a rear partial cam groove which trace substantially the same reference cam diagram by applying the feature of U.S. Pat. No. 7,039,308 to this cam mechanism, at least six partial cam grooves exist on the periphery of the cam ring. Additionally, six cam followers engageable in the six partial cam grooves are formed on the linearly movable ring. However, in the cam mechanism disclosed in U.S. Pat. No. 7,039,308, the possibility that a front cam follower and a rear cam follower that are provided as a pair of cam followers will simultaneously engage in a corresponding pair of (front and rear) partial cam grooves, respectively, is not excluded, and accordingly, a state where the six cam followers simultaneously engage in the six partial cam grooves occurs.

It is generally the case that it is more difficult to control the overall accuracy of the cam mechanism as the number of cam grooves and associated cam followers increases. Namely, in order to make the cam mechanism perform accurate camming operations, the accuracy of engagement between each cam groove and the associated cam follower only needs to be enhanced. However, if such accuracy of engagement is enhanced, the tolerance of the accuracy of engagement becomes small between another cam groove and the associated cam follower. On the other hand, in the cam mechanism disclosed in U.S. Pat. No. 7,039,308, the accuracy of engagement between each partial cam groove and the associated cam follower is required to be strictly precise so that a problem of inadmissible play, or the like, between the remaining cam followers and the associated cam grooves does not occur even in a state where some cam followers come out of the associated partial cam grooves. Namely, there are two contradictory demands: a demand for enhancing the accuracy of engagement between each cam groove and the associated cam follower and a demand for easing the accuracy control of each pair of front and rear cam followers and the associated pair of front and rear cam grooves.

Furthermore, in the above-described cam structure, it is desirable to further reduce the sliding friction between the cam followers and the cam grooves in order to reduce the rotational load on the cam ring.

SUMMARY OF THE INVENTION

The present invention provides a cam mechanism of a retractable zoom lens using a cam ring which is structured so as to strike a balance between ease of accuracy control of each cam groove and the associated cam follower of the cam mechanism and accurate guiding performance, while achieving a reduction in length of the cam ring in an optical axis direction by the use of front and rear partial cam grooves formed at different positions in the optical axis direction. Furthermore, a cam mechanism of a retractable zoom lens is achieved in which the sliding friction between the cam followers and the cam grooves is further reduced so as to reduce the rotational load on the cam ring.

According to an aspect of the present invention, a cam mechanism of a retractable zoom lens is provided, which can move to a ready-to-photograph state which enables a zoom optical system to perform a photographing operation, a retracted state to accommodate the zoom optical system, and a transition state between the ready-to-photograph state and retracted state. The cam mechanism includes a cam ring having cam grooves on a peripheral surface of the cam ring; and a driven member which includes cam followers respectively engaged in the cam grooves, the driven member supporting at least a part of the zoom optical system, and wherein the driven member is supported to be movable relative to the cam ring in an optical axis direction, the cam mechanism moving the driven member forward and rearward in the optical axis direction via engagement of the cam followers with the cam grooves in accordance with relative rotation between the driven member and the cam ring. At least one front cam groove and at least one rear cam groove constitute the cam grooves and are formed at different positions at least in the optical axis direction, the front and rear cam grooves having substantially the same reference cam diagram, being formed in a manner such that a front part of the front cam groove and a rear part of the rear cam groove are omitted from the reference cam diagram, and the front and rear cam grooves having at least one front end opening and at least one rear end opening on a front end surface and a rear end surface of the cam ring, respectively. At least one front cam follower and at least one rear cam follower constitute the cam followers and are engaged in the front cam groove and the rear cam groove, respectively, the front and rear cam followers being formed on the driven member at different positions in the optical axis direction. The front cam follower is disengaged from the front cam groove while the rear cam follower is engaged in the rear cam groove when the driven member is positioned at a limit of forward movement thereof, and the rear cam follower is disengaged from the rear cam groove while the front cam follower is engaged in the front cam groove when the driven member is positioned at a limit of rearward movement thereof. Each of the front and rear cam grooves include a normal-width section for guiding an associated the cam follower with substantially no play, and a wide-width section, which is greater in width than the normal-width section, in which the associated cam follower is loosely engageable therein. When the retractable zoom lens is set at the ready-to-photograph state, one of the front and rear cam followers is engaged in the normal-width section of one associated the cam groove, and the other of the front and rear cam followers is positioned out of the normal-width section of the other associated the cam groove. When the retractable zoom lens is set at the transition state, both the front and rear cam followers are positioned out of the normal-width sections of the associated cam grooves so that at least one of the front and rear cam followers is loosely engaged in the wide-width section of the one associated cam groove.

When the zoom lens is set at the retracted state, it is desirable for both the front and rear cam followers to be loosely engaged in the wide-width sections of the associated cam grooves.

When the zoom lens is set at the retracted state, it is desirable for one of the front and rear cam followers to be engaged in the normal-width section of the one associated cam groove and the other of the front and rear cam followers to be disengaged from the other associated cam groove through the end opening.

It is desirable for the zoom lens to include a plurality of stepwise focal lengths within the ready-to-photograph state which are predetermined to stop the cam ring in a stepwise manner, wherein at least one of the front and rear cam grooves includes a width transition portion within a zoom section thereof which connects the normal-width section and the wide-width section. A rotation of the cam ring is controlled so that each of the front and rear cam followers does not stop at the width transition portion of the associated cam groove in a state where the zoom lens is set at any one of the stepwise focal lengths.

It is desirable for the cam ring to include a plurality of groups of the front and rear cam grooves which are located at different positions in a circumferential direction of the cam ring, and for the driven member to include a plurality of groups of the front and rear cam followers which are located at different positions in a circumferential direction of the driven member. According to this structure, the eccentricity of the driven member can be reduced to a minimum to thereby make it possible to enhance the accuracy of supporting the driven member.

It is desirable for the front end opening of the front cam groove, which is formed on the front end surface of the cam ring, to be formed by the wide-width section of the front cam groove, and for the rear end opening of the rear cam groove, which is formed on the rear end surface of the cam ring, to be formed by the wide-width section of the rear cam groove. This structure makes it possible to make the cam follower which is disengaged from the associated cam groove, engage smoothly into the associated cam groove.

It is desirable for the cam ring to include at least one supplemental cam groove which has the same reference cam diagram as those of the front and rear cam grooves and is formed at a different position from those of the front and rear cam grooves both in the optical axis direction and a circumferential direction of the cam ring.

It is desirable the cam ring includes a cam-groove omitted portion formed on a peripheral surface of the cam ring, wherein no part of one of the front and rear cam grooves exists in the cam-groove omitted portion even though the reference cam diagram of the one of the front and rear cam grooves passes through the cam-groove omitted portion. When one of the front and rear cam followers which is associated with the one of the front and rear cam grooves is positioned in the cam-groove omitted portion, a supplemental cam follower formed on the driven member which is different from the one of the front and rear cam follower is engaged in the supplemental cam groove.

It is desirable for the supplemental cam groove to include an intersecting portion at which the supplemental cam groove intersects the one of the front and rear cam grooves, and for the cam ring to include a second supplemental cam groove for guiding a second supplemental cam follower formed on the driven member which is different from the supplemental cam follower, the second supplemental cam follower being engaged in the second supplemental cam groove when the one of the front and rear cam followers, which is engaged in the one of the front and rear cam grooves, passes through the intersecting portion.

It is desirable for the front and rear cam grooves to be formed as a continuous cam groove and a discontinuous cam groove, respectively.

It is desirable for the zoom optical system to include a plurality of movable lens groups movable in the optical axis direction while changing a distance therebetween by rotation of the cam ring, the driven member holding at least one of the plurality of movable lens groups.

In an embodiment, a cam mechanism of a zoom lens is provided, including a cam ring having cam grooves on a peripheral surface of the cam ring; and a driven member which includes cam followers respectively engaged in the cam grooves, the driven member supporting at least a part of a zoom optical system, and wherein the driven member is supported to be movable relative to the cam ring in an optical axis direction, the cam mechanism moving the driven member forward and rearward in the optical axis direction via engagement of the cam followers with the cam grooves in accordance with relative rotation between the driven member and the cam ring. At least one front cam groove and at least one rear cam groove constitute the cam grooves and are formed at different positions both in the optical axis direction and a circumferential direction of the cam ring, the front and rear cam grooves having substantially the same reference cam diagram, being formed in a manner such that a front part of the front cam groove and a rear part of the rear cam groove are omitted from the reference cam diagram, the front and rear cam grooves having at least one front end opening and at least one rear end opening on a front end surface and a rear end surface of the cam ring, respectively. At least one front cam follower and at least one rear cam follower constitute the cam followers and are engaged in the front cam groove and the rear cam groove, respectively, the front and rear cam followers being formed on the driven member at different positions both in the optical axis direction and the circumferential direction. The front cam follower is disengaged from the front cam groove while the rear cam follower is engaged in the rear cam groove when the driven member is positioned at a limit of forward movement thereof, and the rear cam follower is disengaged from the rear cam groove while the front cam follower is engaged in the front cam groove when the driven member is positioned at a limit of rearward movement thereof. Each of the front cam groove and the rear cam groove includes a normal-width section for guiding the associated cam follower with substantially no play and a wide-width section which is greater in width than the normal-width section so that each of the front cam follower and the rear cam follower is loosely engaged therein. When zoom lens is set at a ready-to-photograph state, it is desirable for one of the front and rear cam followers to be engaged in the normal-width section of the associated cam groove, and the other of the front and rear cam follower to be positioned out of the normal-width section of the associated cam groove.

According to the cam mechanism to which the present invention is applied, the accuracy control of each cam groove and the associated cam follower is made easy, and an accurate guiding performance is achieved while a reduction in length of the cam ring by the use of front and rear partial cam grooves formed at different positions in an optical axis direction is achieved. Furthermore, rotational loads on the cam ring can be reduced during the transition state between the retractable state and the ready-to-photograph state of the zoom lens.

The present disclosure relates to subject matter contained in Japanese Patent Application No. 2008-23517 (filed on Feb. 4, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
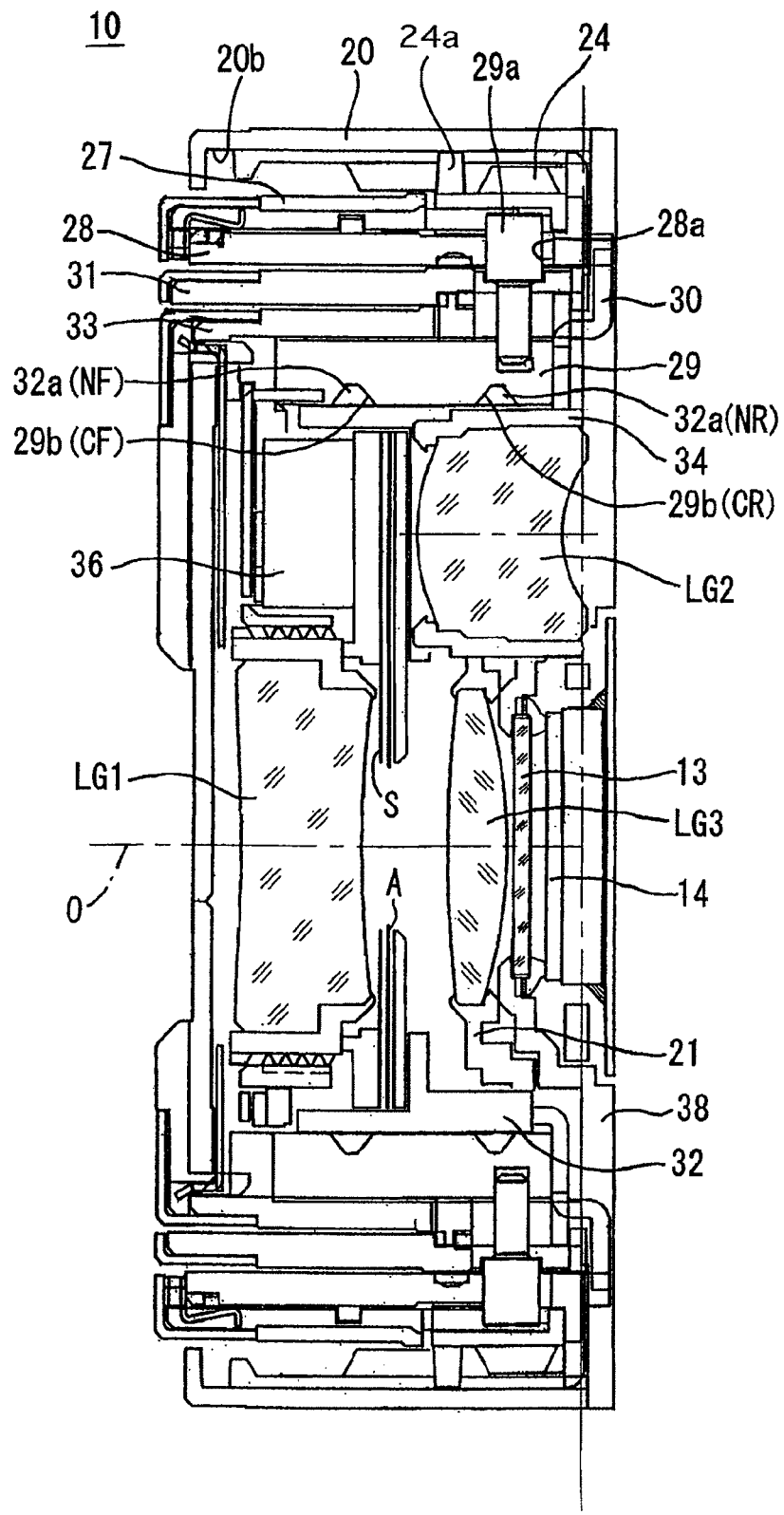
FIG. 1 is a cross sectional view of an embodiment (first embodiment) of a retractable type of zoom lens having a cam mechanism according to the present invention, showing the lens barrel accommodated state (retracted state) of the zoom lens.
Figure 2:
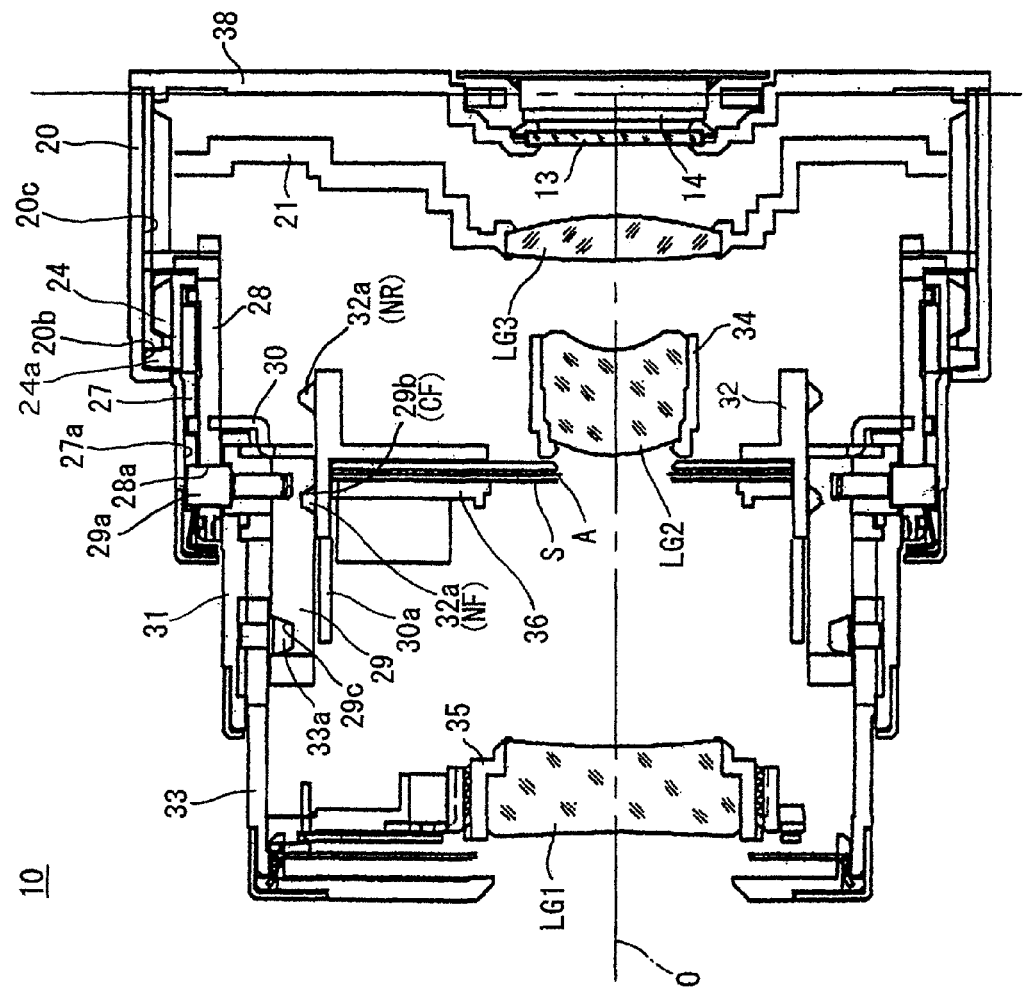
FIG. 2 is a cross sectional view of the zoom lens, showing the zoom lens set at the wide-angle extremity.
Figure 3:
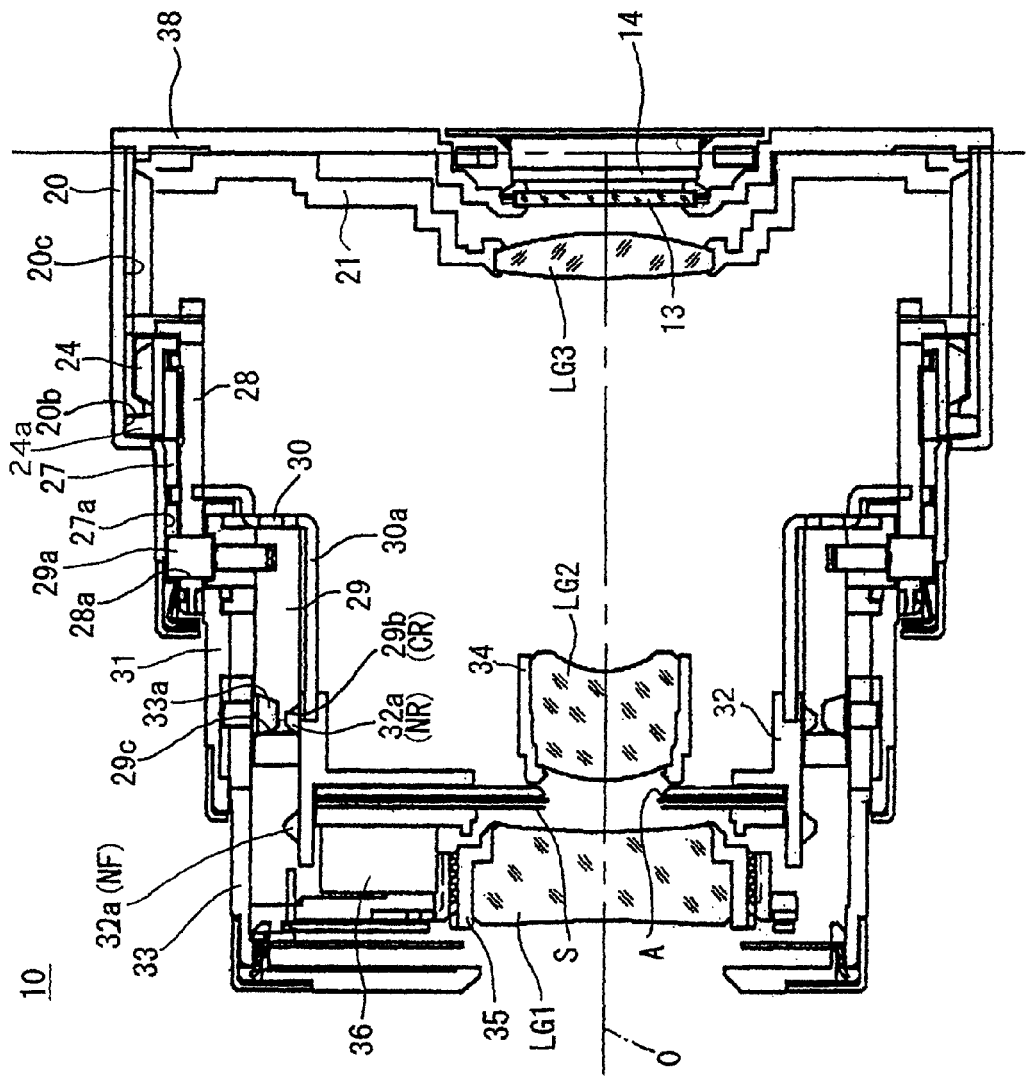
FIG. 3 is a cross sectional view of the zoom lens, showing the zoom lens set at the telephoto extremity.

FIGS. 1 through 3 show cross sectional views of an embodiment (first embodiment) of a retractable type of zoom lens (zoom lens barrel) 10 having a cam mechanism according to the present invention. FIG. 1 shows the lens barrel accommodated state (retracted state) of the zoom lens 10, in which no pictures are taken, FIG. 2 shows the zoom lens 10 set at the wide-angle extremity, and FIG. 3 shows the zoom lens 10 set at the telephoto extremity. The zoom lens 10 is constructed so that a CCD image sensor unit supported by a CCD holder 38 is mounted to the back of a lens group unit supported by a housing 20 of the zoom lens 10.

A photographing optical system of the zoom lens 10 includes a first lens group LG1, a shutter S, an adjustable diaphragm A, a second lens group LG2, a third lens group LG3, a low-pass filter (optical filter) 13, and a CCD image sensor (image pickup device) 14. This photographing optical system is a zoom optical system (zoom optical system) in which the focal length is variable. The first lens group LG1 and the second lens group LG2 are moved along an optical axis O of the zoom optical system in a predetermined moving manner to perform a zooming operation. In addition, the third lens group L3 is moved along the optical axis O to perform a focusing operation.

Among the optical elements which constitute the optical system of the zoom lens 10, the low-pass filter 13 and the CCD image sensor 14 are held by the CCD holder 38. The CCD image sensor 14 is supported by the CCD holder 38 thereon to be movable in biaxial directions, namely, two orthogonal directions in a plane parallel to the imaging surface of the CCD image sensor 14. By moving the CCD image sensor 14 by two correction motors 61 in accordance with the angular velocity of camera shake in the biaxial directions which is applied to the camera (not shown), to which the zoom lens 10 is mounted, image shake of an object image to be photographed via the CCD image sensor 14 can be reduced.

The zoom lens 10 is provided with a third lens frame 21 which holds the third lens group LG3. The third lens group LG3 is guided linearly in a direction parallel to the optical axis O via a guide shaft 22 fixed to the housing 20 and can be driven forward and rearward by driving force of an AF motor 23 (see FIG. 4) in the same direction.

The zoom lens 10 is provided in the stationary barrel 20 with a helicoid ring 24 which is positioned inside the stationary barrel 20 to be supported thereby. The helicoid ring 24 is provided on an outer peripheral surface thereof with a gear which is in mesh with a zoom gear 25. The zoom gear 25 is driven to rotate by a zoom motor 26 (see FIG. 4) to transfer rotational force to the helicoid ring 24. When the zoom lens 10 is in a state between the lens barrel accommodated (retracted) state shown in FIG. 1 and the state shown in FIG. 2 in which the zoom lens 10 is set at the wide-angle extremity, the housing 20 and the helicoid ring 24 are coupled to each other by helicoid threads, and driving the zoom motor 26 causes the helicoid ring 24 to move in the optical axis direction (direction of the optical axis O) while rotating and being guided by female helicoidal threads 20a (see FIG. 4) formed on an inner peripheral surface of the housing 20. On the other hand, when the zoom lens 10 is in a ready-to-photograph state between the wide-angle extremity and the telephoto extremity, the aforementioned helicoid coupling is released, and thereupon projections 24a formed on an outer peripheral surface of the helicoid ring 24 are engaged in a circumferential groove 20b formed on an inner peripheral surface of the housing 20 so that the helicoid ring 24 rotates at an axial fixed position, i.e., without moving in the optical axis direction, in accordance with the driving operation of the zoom motor 26. A first advancing barrel 27 which rotates about the optical axis O and moves in the optical axis direction with the helicoid ring 24 is coupled to the front of the helicoid ring 24.

The zoom lens 10 is provided inside the helicoid ring 24 with a first linear guide ring 28. The first linear guide ring 28 is guided linearly in the optical axis direction via linear guide grooves 20c formed on an inner peripheral surface of the housing 20, and is engaged with the first advancing barrel 27 and the helicoid ring 24 to move with the first advancing barrel 27 and the helicoid ring 24 and to be allowed to rotate relative to the first advancing barrel 27 and the helicoid ring 24.

Figure 4:
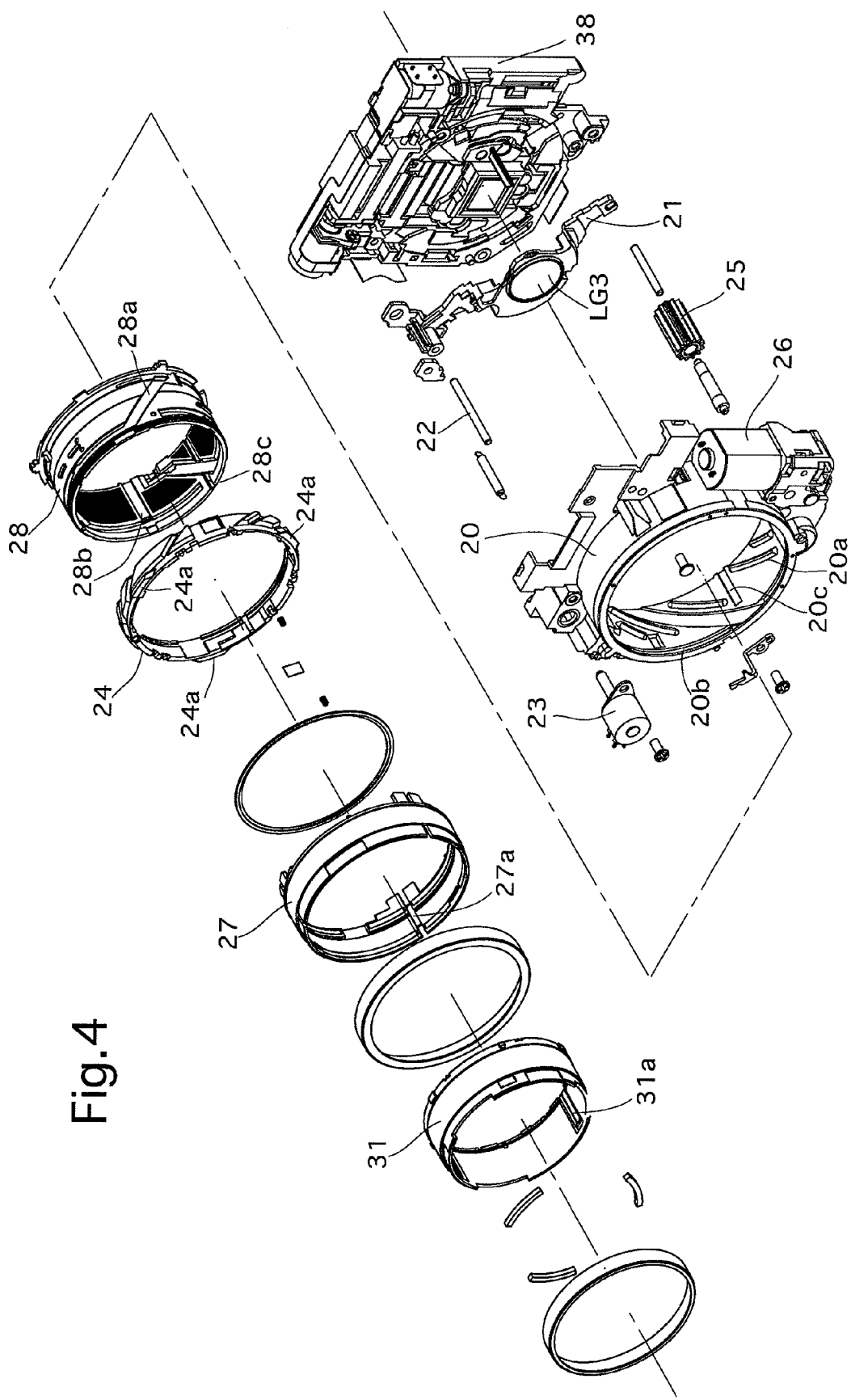
FIG. 4 is an exploded perspective view of the zoom lens, showing a part of the main elements thereof.

As shown in FIG. 4, the first linear guide ring 28 is provided with a set of three guide slots (through slots) 28a which are formed through inner and outer peripheral surfaces of the first linear guide ring 28. Each guide slot 28a is provided with a lead groove portion inclined relative to the optical axis O and a circumferential groove portion about the optical axis O, and a set of three radially outer projections 29a formed on an outer peripheral surface of the cam ring 29 are slidably engaged in the set of three guide slots 28a, respectively. The set of three radially outer projections 29a are further engaged in a set of three rotation transfer grooves 27a which are formed on an inner peripheral surface of the first advancing barrel 27 to extend parallel to the optical axis O, so that the cam ring 29 rotates with the first advancing barrel 27. The cam ring 29 advances and retracts in the optical axis direction while rotating and being guided by the lead groove portions of the three guide slots 28a when each radially outer projection 29a engages in the lead groove portion of the associated guide slot 28a, and rotates at an axial fixed position, i.e., without moving in the optical axis direction, relative to the first advancing barrel 27 and the first linear guide ring 28 when each radially outer projection 29a engages in the circumferential groove portion of the associated guide slot 28a. Similar to the helicoid ring 24, the cam ring 29 moves forward and rearward in the optical axis direction while rotating when the zoom lens 10 is in a state between the lens barrel accommodated (retracted) state and a ready-to-photograph state (the wide-angle extremity), and rotates at an axially fixed position when the zoom lens 10 is in a ready-to-photograph state between the wide-angle extremity and the telephoto extremity.

The first linear guide ring 28 guides a second linear guide ring 30 and a second advancing barrel 31 linearly in the optical axis direction via a set of three linear guide grooves 28b and another set of three linear guide grooves 28c (see FIG. 4), respectively, which are formed on an inner peripheral surface of the first linear guide ring 28 to extend parallel to the optical axis O. The second linear guide ring 30 is provided with a set of three linear guide keys 30a which project forward, and guides a second lens group moving frame (driven member) 32 linearly in the optical axis direction via the set of three linear guide keys 30a. The second lens group moving frame 32 supports the second lens group LG2 via a second lens frame 34. The second lens frame 34 is positioned inside the second lens group moving frame 32 and supported thereby to be swingable about an axis parallel to the optical axis O. The second advancing barrel 31 guides a third advancing barrel 33 linearly in the optical axis direction via a set of three linear guide grooves 31a (see FIG. 4) formed on an inner peripheral surface of the second advancing barrel 31. The third advancing barrel 33 supports the first lens group LG1 via a first lens frame 35. The second linear guide ring 30 and the second advancing barrel 31 are supported by the cam ring 29 to be rotatable relative to the cam ring 29 and to be movable with the cam ring 29 in the optical axis direction.

The cam ring 29 is provided on an inner peripheral surface thereof with six inner cam grooves (second-lens-group guiding cam grooves) 29b for guiding the second lens group LG2, and the second lens group moving frame 32 is provided on an outer peripheral surface thereof with six cam followers 32a for moving the second lens group LG2 which are engaged in the six inner cam grooves 29b, respectively. The second lens group moving frame 32 is guided linearly in the optical axis direction via the second linear guide ring 30, and accordingly, a rotation of the cam ring 29 causes the second lens group moving frame 32, i.e., the second lens group LG, to move in the optical axis direction in a predetermined moving manner in accordance with the contours of the inner cam grooves 29b.

Figure 5:
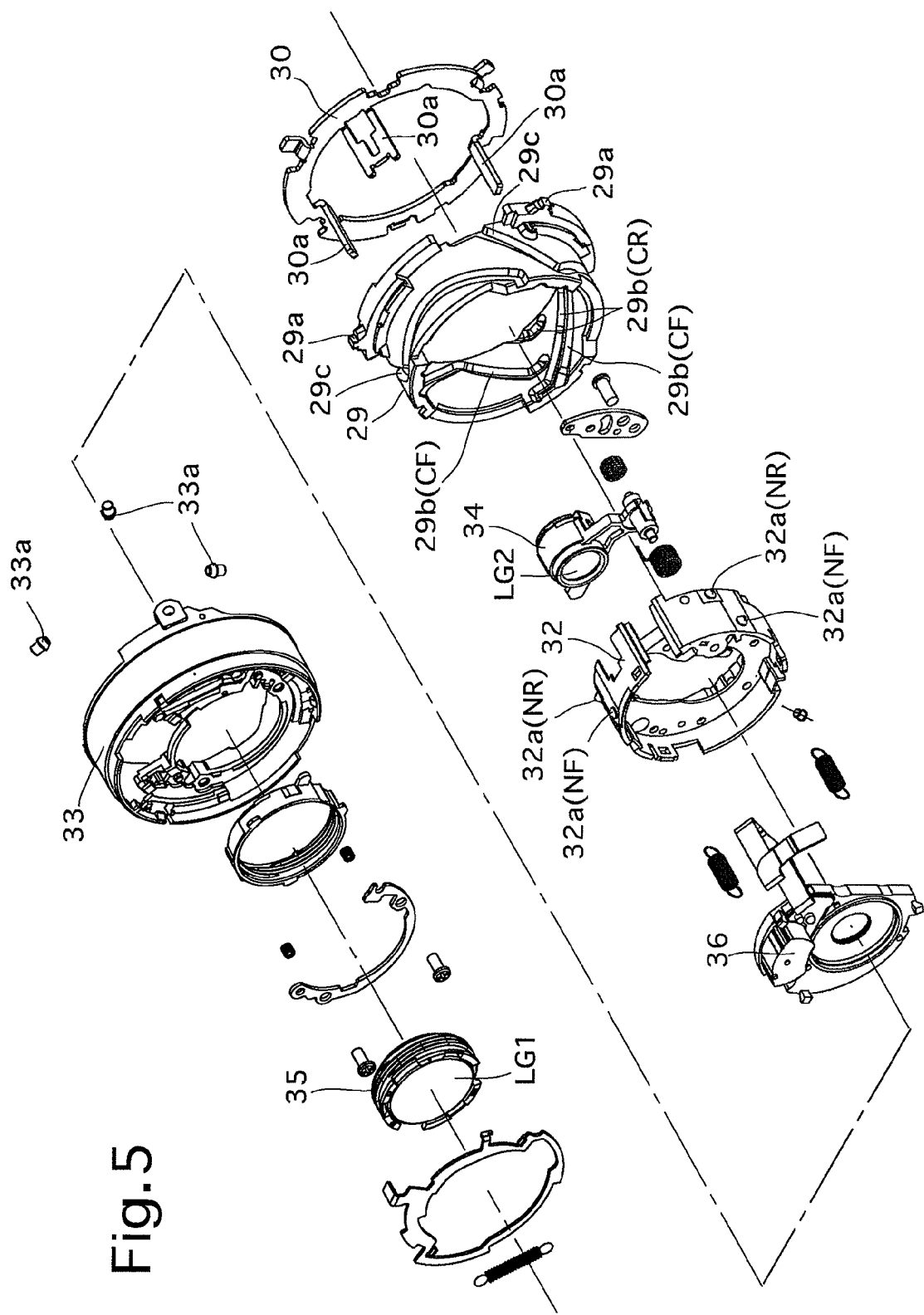
FIG. 5 is an exploded perspective view of the zoom lens, showing another part of the main elements thereof.

A set of three cam followers 33a (see FIG. 5) for moving the first lens group LG1 are fixed to the third advancing barrel 33 so as to project radially outwards and to be slidably engaged in a set of three outer cam grooves (first-lens-group guiding cam grooves) 29c formed on an outer peripheral surface of the cam ring 29, respectively. The third advancing barrel 33 is guided linearly in the optical axis direction via the second advancing barrel 31, and accordingly, a rotation of the cam ring 29 causes the third advancing barrel 33, i.e., the first lens group LG1, to move in the optical axis direction in a predetermined moving manner in accordance with the contours of the outer cam grooves 29c.

The zoom lens 10 is provided between the first lens group LG1 and the second lens group LG2 with a shutter unit 36 which includes a shutter S and a diaphragm A. The shutter unit 36 is fixed to the inside of the second lens group moving frame 32.

Operations of the zoom lens 10 that has the above described structure will be discussed hereinafter. In the lens barrel accommodated state shown in FIG. 1, the zoom motor 26 is actuated to rotate in a lens barrel advancing direction upon a main switch (not shown) of the camera to which the zoom lens 10 is mounted being turned ON. The zoom gear 25 is driven to rotate by the zoom motor 26, and this rotation of the zoom gear 25 causes the helicoid ring 24 and the first advancing barrel 27 to move forward while rotating and being guided by the female helicoidal threads 20a of the housing 20. The first linear guide ring 28 linearly moves forward with the first advancing barrel 27 and the helicoid ring 24. At this time, the cam ring 29 which is given a rotational force from the first advancing barrel 27 moves forward in the optical axis direction by an amount of movement corresponding to the sum of the amount of the forward movement of the first linear guide ring 28 and the amount of the forward movement of the cam ring 29 by a lead structure (composed of the set of three radially outer projections 29a of the cam ring 29 and the lead groove portions of the three guide slots 28a of the first linear guide ring 28) provided between the cam ring 29 and the first linear guide ring 28. Upon the helicoid ring 24 and the cam ring 29 being advanced to respective predetermined positions thereof, the functions of the rotating/advancing structures (helicoid and lead structures) of the helicoid ring 24 and the cam ring 29 are cancelled, so that the helicoid ring 24 and the cam ring 29 only rotate at respective axial fixed positions thereof in the optical axis direction.

A rotation of the cam ring 29 causes the second lens group moving frame 32, that is guided linearly via the second linear guide ring 30 inside the cam ring 29, to move in the optical axis direction in a predetermined moving manner due to the engagement of the six cam followers 32a with the six inner cam grooves 29b, respectively. The second lens frame 34 is held at a position (radially retracted position) where the second lens group LG2 is retracted away from the optical axis O as shown in FIG. 1 when the zoom lens 10 is in the lens barrel accommodated state. The second lens frame 34 swings in a direction to bring the second lens group LG2 to an on-axis position where the optical axis of the second lens group LG2 is coincident with the optical axis O when the second lens group moving frame 32 is moved forward. Additionally, a rotation of the cam ring 29 causes the third advancing barrel 33, which is guided linearly via the second advancing barrel 31 outside the cam ring 29, to move in the optical axis direction in a predetermined moving manner due to the relationship between the set of three cam followers 33a with the set of three outer cam grooves 29c.

Namely, the amount of advancement of the first lens group LG1 from the lens barrel accommodated state is determined by the sum of the amount of forward movement of the cam ring 29 relative to the housing 20 and the amount of advancement of the third advancing barrel 33 relative to the cam ring 29, and the amount of advancement of the second lens group LG2 from the lens barrel accommodated state is determined by the sum of the amount of forward movement of the cam ring 29 relative to the housing 20 and the amount of advancement of the second lens group moving frame 32 relative to the cam ring 29. A zooming operation is carried out by moving the first lens group LG1 and the second lens group LG2 along the photographing optical axis O while changing the air distance between the first lens group LG1 and the second lens group LG2. When the zoom lens 10 is driven to advance from the lens barrel accommodated state shown in FIG. 1, the zoom lens 10 firstly moves to a lens barrel advanced state shown in FIG. 2 in which the zoom lens 10 is set at the wide-angle extremity. Subsequently, the zoom lens 10 moves to a lens barrel advanced state shown in FIG. 3 in which the zoom lens 10 is set at the telephoto extremity by a further rotation of the zoom motor 26 in a lens barrel advancing direction thereof. In the zoom range between the wide-angle extremity and the telephoto extremity, the helicoid ring 24, the first advancing barrel 27 and the cam ring 29 rotate at their respective axial fixed positions, i.e., without moving in the optical axis direction. Upon the aforementioned main switch of the camera being turned OFF, the zoom motor 26 is driven to rotate in the lens barrel retracting direction, so that the zoom lens 10 operates in the reverse manner to the above described advancing operations to thereby move to the lens barrel accommodated state shown in FIG. 1.

When the zoom lens 10 is in a ready-to-photograph state between the wide-angle extremity and the telephoto extremity, the third lens frame 21 that supports the third lens group LG3 moves along the optical axis O to perform a focusing operation by driving the AF motor 23 in accordance with object distance information obtained via a distance measuring device (not shown).

Figure 6:
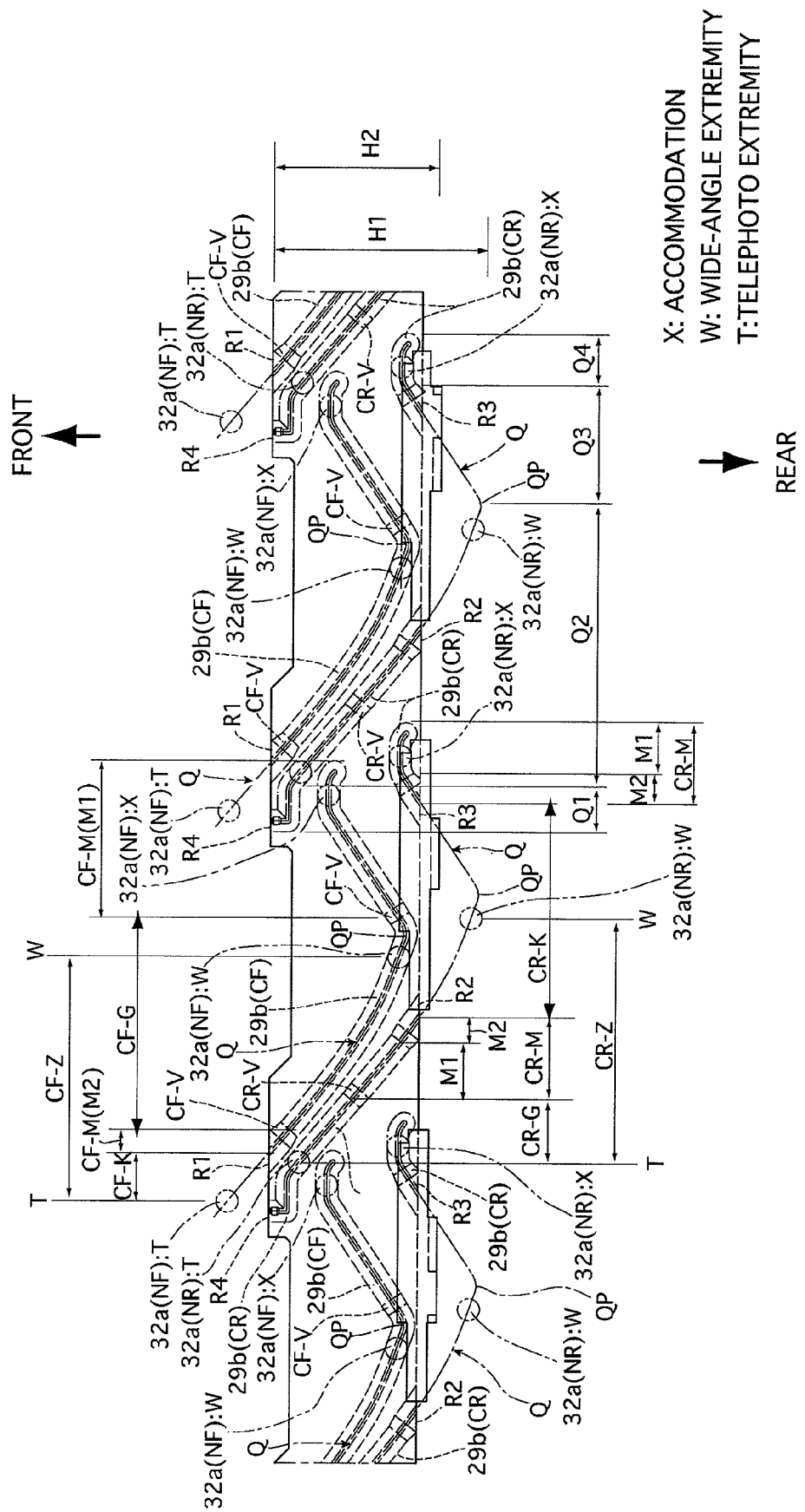
FIG. 6 is a developed view of the cam ring shown in FIG. 5.

FIG. 6 is a developed plan view of the cam ring 29 and shows the cam diagrams and the contours of the six inner cam grooves 29b that are formed on an inner peripheral surface of the cam ring 29. The six inner cam grooves 29b have six reference cam diagrams Q having substantially the same shape and size, respectively, for giving a required movement to the second lens group moving frame 32. Each reference cam diagram Q represents the conceptual shape of each cam groove of the six inner cam grooves 29b, and includes a lens-barrel operating section and a lens-barrel assembling/disassembling section, wherein the lens-barrel operating section includes a zooming section and a lens barrel accommodating section. The lens-barrel operating section is designed to move the second lens group moving frame 32 from an accommodated position of the second lens group moving frame 32 which corresponds to the lens barrel accommodated state of the zoom lens 10 to a position (telephoto extremity position) of the second lens group moving frame 32 which corresponds to the telephoto extremity of the zoom lens 10 via another position (wide-angle extremity position) of the second lens group moving frame 32 which corresponds to the wide-angle extremity of the zoom lens 10. The lens-barrel assembling/disassembling section is used only when the zoom lens 10 is assembled or disassembled. In other words, the lens-barrel operating section serves as a control section which controls movement of the second lens group moving frame 32 with respect to the cam ring 29 via a cam mechanism in a completely assembled state of the zoom lens 10, and which is distinguished from the lens-barrel assembling/disassembling section. The zooming section serves as a control section which controls the movement of the second lens group moving frame 32 with respect to the cam ring 29, especially from the wide-angle extremity position of the second lens group moving frame 32 to the telephoto extremity position of the second lens group moving frame 32, and which is to be distinguished from the lens-barrel accommodating section.

As can be understood from FIG. 6, the length of an axial range H1 of the six reference cam diagrams Q in the optical axis direction (the vertical direction as viewed in FIG. 6) is greater than the length H2 of the cam ring 29 in the optical axis direction. This means that a set of cam grooves each having a sufficient length cannot be achieved for the present embodiment of the cam ring 29 if designed according to a conventional method of formation of cam groove wherein a set of long cam grooves which entirely trace a corresponding set of reference cam diagrams (Q) are formed on a peripheral surface of a cam ring. According to a cam mechanism of the present embodiment of the zoom lens, a sufficient range of movement of the second lens group moving frame 32 in the optical axis direction can be secured without increasing the length of the cam ring 29 in the optical axis direction. Details of this cam mechanism will be discussed hereinafter.

As shown in FIG. 6, the six inner cam grooves 29b consist of two types of cam grooves: a set of three front cam grooves CF and a set of three rear cam grooves CR formed behind the set of three front cam grooves CF in the optical axis direction, respectively. Although all of the six inner cam grooves 29b (the three front cam grooves CF and the three rear cam grooves FR) of the cam ring 29 are formed by tracing the six reference cam diagrams Q, respectively, each front cam groove CF does not cover the entire range of the associated reference cam diagram Q, and each rear cam groove CR does not cover the entire range of the associated reference cam diagram Q either. A range of each front cam groove CF which is included in the associated reference cam diagram Q is partly different from a range of each rear cam groove CR which is included in the associated reference cam diagram Q. Each reference cam diagram Q includes first through fourth sections Q1 through Q4. The first section Q1 is cranked and positioned at the frontmost position of the cam ring 29 in the optical axis direction. The second section Q2 extends from a first inflection point positioned at the rear end of the first section Q1 to a second inflection point QP positioned rearwards in the optical axis direction with respect to the first inflection point. The third section Q3 extends forward from the second inflection point QP to a third inflection point positioned forward in the optical axis direction from the second inflection point QP. The fourth section Q4 extends from the third inflection point to the closed end of the cam groove. Each front cam groove CF is formed in the vicinity of the front end of the cam ring 29 so as not to include the entire part of the first section Q1 and a front part of the second section Q2, and is formed so as to include a front end opening R1 at an intermediate point of the second section Q2 so that the front end opening R1 opens on a front end surface of the cam ring 29. On the other hand, each rear inner cam groove CR is formed in the vicinity of the rear end of the cam ring 29 so as not to include adjoining portions of the second section Q2 and the third section Q3 on opposite sides of the second inflection point QP, and is formed so as to include a rear end opening R2 at an intermediate point of the second section Q2 and a rear end opening R3 at an intermediate point of the third section Q3 so that the rear end openings R2 and R3 open on a rear end surface of the cam ring 29. In addition, each rear cam groove CR is formed so as to include a front end opening R4 at the front end of the first section Q1 so that the front end opening R4 opens on a front end surface of the cam ring 29. A groove-omitted portion of each front cam groove CF on the associated reference cam diagram Q is included in the associated rear cam groove CR that is positioned behind the front cam groove CF in the optical axis direction, whereas a groove-omitted portion of each rear cam groove CR on the associated reference cam diagram Q is included in the associated front cam groove CF that is positioned in front of the rear cam groove CR in the optical axis direction. Namely, if each front cam groove CF and the associated rear cam groove CR that are provided as a pair of cam grooves are combined into a single cam groove, this single cam groove will include the entire part of one reference cam diagram Q. In other words, each front cam groove CF is complemented by the associated rear cam groove CR, and vice versa. The set of three front cam grooves CF and the set of three rear cam grooves CR are formed on an inner peripheral surface of the cam ring 29 at different positions in a circumferential position of the cam ring 29. The circumferential positions of each pair of one front cam groove CF and associated one rear cam groove CR are different each other in order to achieve a reduction in length of the cam ring 29 in the optical axis direction.

The six cam followers 32a, which are respectively engaged in the six inner cam grooves 29b, consist of the set of three front cam followers NF that are formed at different circumferential positions, and the set of three rear cam followers NR that are formed at different circumferential positions behind the set of three front cam followers NF in the optical axis direction, wherein each front cam follower NF and the rear cam follower NR positioned therebehind in the optical axis direction are provided as a pair so as to have a positional relationship similar to that of each pair of inner cam grooves 29b. The space between the set of three front cam followers NF and the set of three rear cam followers NR in the optical axis direction is determined so that the set of three front cam followers NF are respectively engaged in the set of three front cam grooves CF and so that the set of three rear cam followers NR are respectively engaged in the set of three rear cam grooves CR. The diameter of each front cam follower NF and the diameter of each rear cam follower NR are the same. In FIGS. 6 through 11, the symbol "(X)", "(W)" or "(T)" which is appended as a suffix to the reference numeral of each cam follower 32a indicates that the position of the cam follower 32a when the zoom lens 10 is in the lens barrel accommodated state, when the zoom lens 10 is set at the wide-angle extremity in the zoom range or when the zoom lens 10 is set at the telephoto extremity in the zoom range, respectively.

Figure 7:
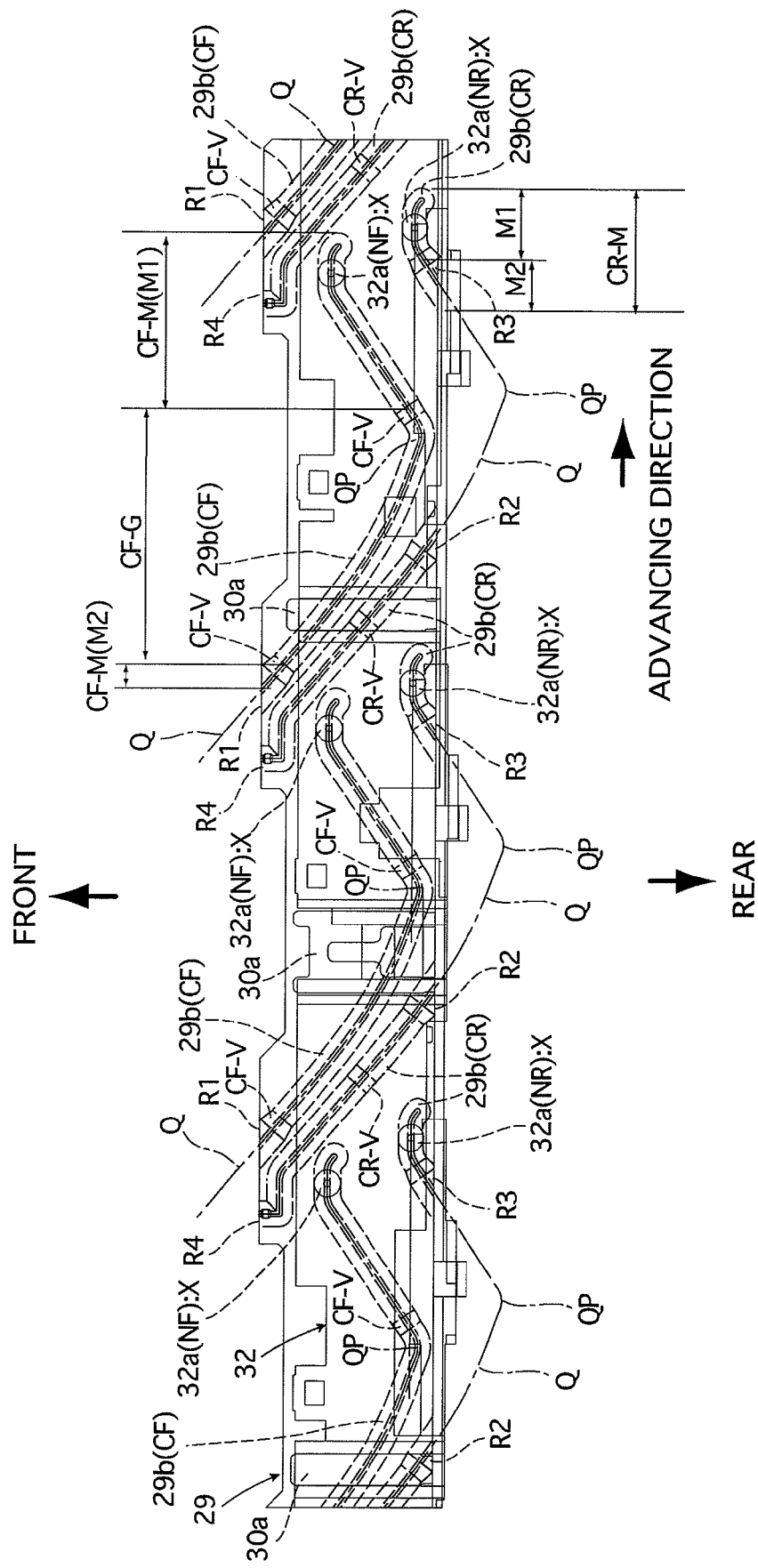
FIG. 7 is a developed view of the cam ring, the second lens group moving frame and the second linear guide ring that are shown in FIG. 5, showing the cam mechanism in the lens barrel accommodated state of the zoom lens.

FIG. 7 shows the positional relationship between the six inner cam grooves 29b and the six cam followers 32a when the zoom lens 10 is in the lens barrel accommodated state as shown in FIG. 1. When the zoom lens 10 is in the lens barrel accommodated state, each cam follower 32a is positioned in the fourth section Q4 of the reference cam diagram Q of the associated inner cam groove 29b. Since both the front cam groove CF and the rear cam groove CR include the fourth section Q4, each front cam follower NF and each rear cam follower NR are positioned in the front cam groove CF and the rear cam groove CR of the associated inner cam grooves 29b, respectively.

Rotating the cam ring 29 in the lens barrel advancing direction (rightward as viewed in FIG. 7) in the lens barrel accommodated state shown in FIG. 7 causes each front cam follower NF and each rear cam follower NR to be guided rearward in the optical axis direction to move on the third section Q3 toward the second inflection point QP by the associated front cam groove CF and the associated rear cam groove CR in accordance with the contours thereof, respectively. During this movement of each cam follower 32a, each rear cam follower NR is disengaged from the associated rear cam groove CR through the rear end opening R3 thereof which opens on the rear end surface of the cam ring 29 because each rear cam groove CR does not include adjoining portions of the second section Q2 and the third section Q3 on opposite sides of the second inflection point QP. At this stage, each front cam follower NF remains engaged in the associated front cam groove CF since each front cam groove CF includes a rear portion thereof in the optical axis direction which corresponds to the omitted rear portion of each rear cam groove CR in the optical axis direction. Upon each rear cam follower NR being disengaged from the associated rear cam groove CR through the rear end opening R3 thereof, the second lens group moving frame 32 moves in the optical axis direction by rotation of the cam ring 29 due only to the engagement of each front cam follower NF with the associated front cam groove CF.

Figure 8:
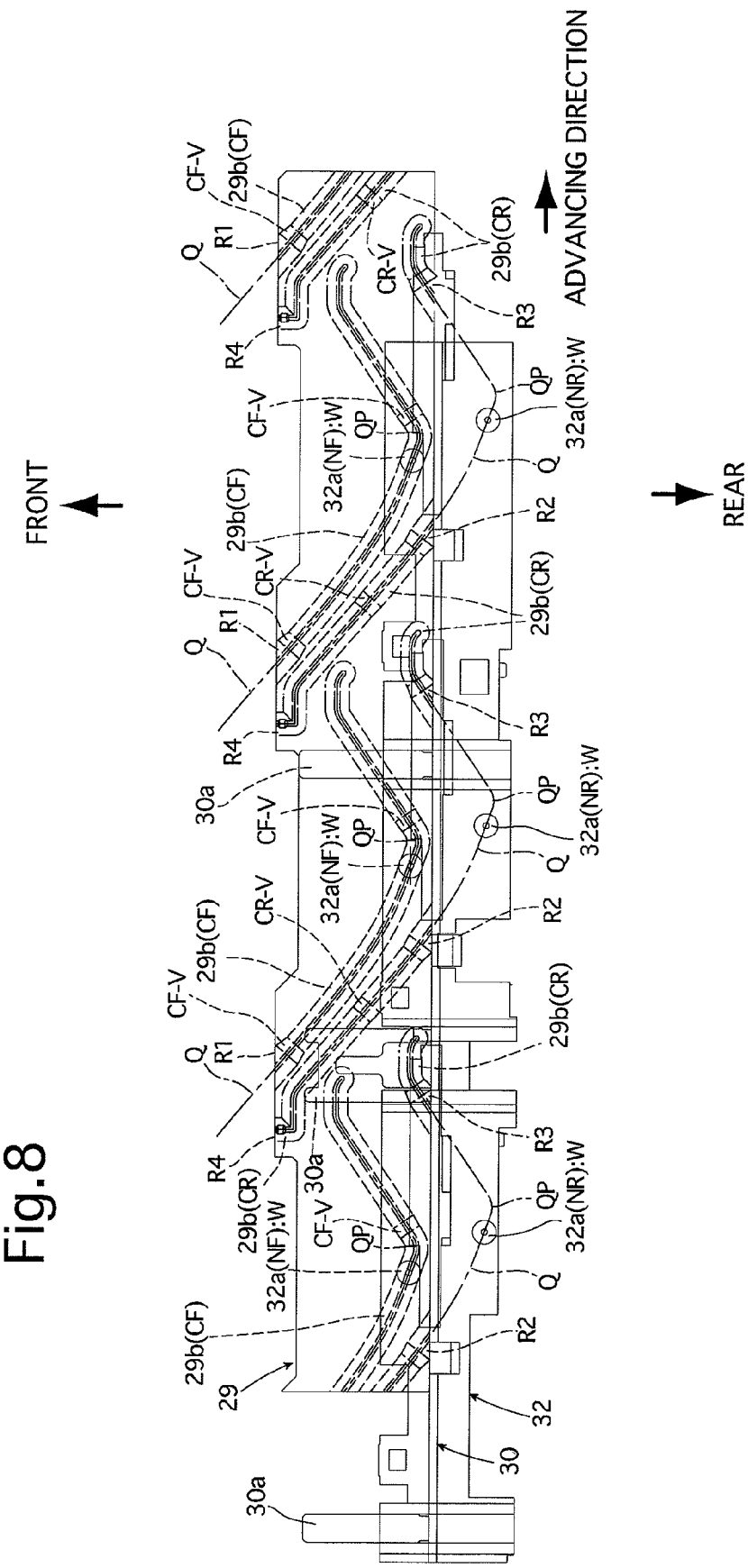
FIG. 8 is a developed view of the cam ring, the second lens group moving frame and the second linear guide ring, showing the cam mechanism in a ready-to-photograph state of the zoom lens at the wide-angle extremity.

FIG. 8 shows the positional relationship between the six inner cam grooves 29b and the six cam followers 32a when the zoom lens 10 is set at the wide-angle extremity as shown in FIG. 2. In this state shown in FIG. 8, each front cam follower NF on the associated reference cam diagram Q is positioned in the second section Q2 slightly beyond the second inflection point QP. Although each rear cam follower NR is currently disengaged from the associated rear cam groove CR through the rear end opening R3 thereof as described above, each rear cam follower CR remains positioned on the associated reference cam diagram Q because the associated front cam follower NF that is positioned in front of the currently disengaged rear cam follower NR remains engaged in the associated front cam groove CF.

Rotating the cam ring 29 in the lens barrel advancing direction (rightward as viewed in FIG. 8) in the state shown in FIG. 8, in which the zoom lens 10 is set at the wide-angle extremity, causes each front cam follower NF to be guided forward in the optical axis direction to move on the second section Q2 toward the first section Q1 by the associated front cam groove CF. With this forward movement of each front cam follower NF, each rear cam follower NR which is currently disengaged from the associated rear cam groove CR moves on the second section Q2 toward the first section Q1, and enters the rear end opening R2 formed on the rear end surface of the cam ring 29 to be re-engaged in the associated rear cam groove CR. Upon this re-engagement of each rear cam follower NR with the associated rear cam groove CR, each front cam follower NF and each rear cam follower NR are guided by the associated front cam groove CF and the associated rear cam groove CR, respectively. However, shortly after the re-engagement of each rear cam follower NR with the associated rear cam groove CR, each front cam follower NF is disengaged from the associated front cam groove CF forward through the front end opening R1 that opens on the front end surface of the cam ring 29 because a front part of each front cam groove CF on the associated reference cam diagram Q in the optical axis direction is omitted. On the other hand, each rear cam follower NR remains engaged in the associated rear cam groove CR since each rear cam groove CR includes a front end portion thereof in the optical axis direction which corresponds to the omitted front end portion of each front cam groove CF in the optical axis direction. Upon each front cam follower NF being disengaged forward from the associated front cam groove CF through the front end opening R1 thereof, the second lens group moving frame 32 moves in the optical axis direction by rotation of the cam ring 29 due only to the engagement of each rear cam follower NR with the associated rear cam groove CR.

Figure 9:
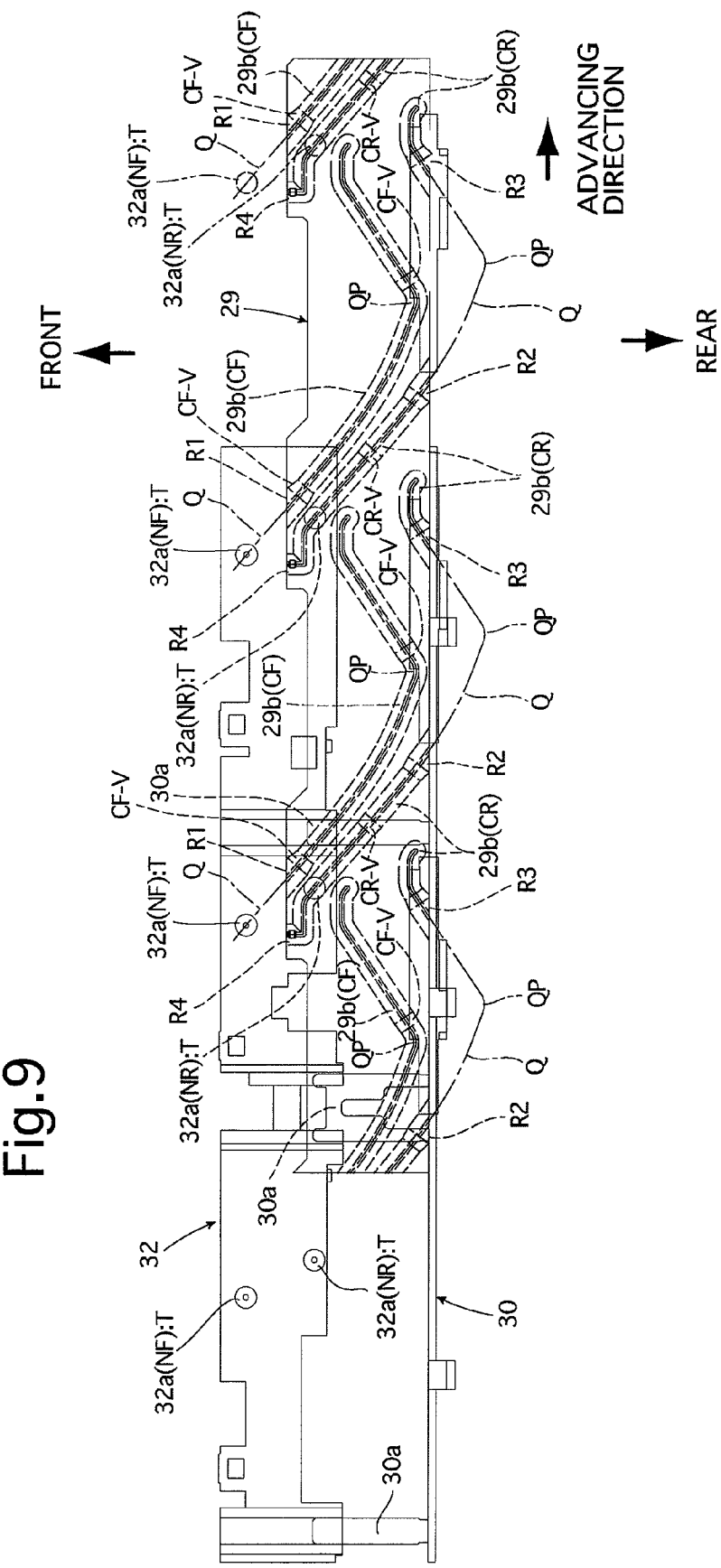
FIG. 9 is a developed view of the cam ring, the second lens group moving frame and the second linear guide ring, showing the cam mechanism in a ready-to-photograph state of the zoom lens at the telephoto extremity.

FIG. 9 shows the positional relationship between the six inner cam grooves 29b and the six cam followers 32a when the zoom lens 10 is set at the telephoto extremity as shown in FIG. 3. In this state shown in FIG. 9, each cam follower 32a on the associated reference cam diagram Q is positioned in the vicinity of the front end of the second section Q2 (in the vicinity of the first section Q1). Although each front cam follower NF is currently disengaged from the associated front cam groove CF through the front end opening R1 thereof as described above, each front cam follower NF remains on the associated reference cam diagram Q because the associated rear cam follower NR positioned behind the currently disengaged front cam follower NF remains engaged in the associated rear cam groove CR.

Further rotating the cam ring 29 in the lens barrel advancing direction in the state shown in FIG. 9, in which the zoom lens 10 is set at the telephoto extremity, causes each rear cam follower NR to enter the first section Q1 of the associated reference cam diagram Q via the first inflection point and reach a position in the associated rear cam groove CR behind the front end opening R4 thereof. At this stage, each front cam follower NF has been disengaged from the associated front cam groove CF, and accordingly, moving the second lens group moving frame 32 forward relative to the cam ring 29 in the optical axis direction causes each rear cam follower NR to be disengaged from the associated rear cam groove CR via the front end opening R4 thereof, which makes it possible to remove the second lens group moving frame 32 from the cam ring 29. Namely, the first sections Q1 of the six reference cam diagrams Q serve as disassembly (or assembly) sections used to remove the second lens group moving frame 32 from the cam ring 29 (or assemble the second lens group moving frame 32 into the cam ring 29). In a normal usage state of the zoom lens 10, there is no possibility of each cam follower 32a being moved to the first section Q1 of the associated reference cam diagram Q.

As described above, each pair of cam grooves having the same reference cam diagram Q, i.e., each front cam groove CF and the associated rear cam groove CR are formed at different positions in the optical axis direction on the cam ring 29; moreover, each front cam groove CF and the associated rear cam groove CR are formed so that the front cam groove CF opens on the front end surface of the cam ring 29 with the front cam groove CF not including a part of the associated reference cam diagram Q and so that the rear cam groove CR opens on the rear end surface of the cam ring 29 with the rear cam groove CR not including a part of the associated reference cam diagram Q; and furthermore, the front cam groove CF and the rear cam groove CR complement each other so that each inner cam groove 29b covers the entire part of one reference cam diagram Q. In addition, only each rear cam follower NR is engaged in the associated rear cam groove CR when the second lens group moving frame 32 is positioned at the front limit for the axial movement thereof with respect to the cam ring 29 (which is in the vicinity of the telephoto extremity of the zoom lens 10), and only each front cam follower NF is engaged in the associated front cam groove CF when the second lens group moving frame 32 is positioned at the rear limit for the axial movement thereof with respect to the cam ring 29 (which is in the vicinity of the wide-angle extremity of the zoom lens 10). With this structure, a sufficient range of movement of the second lens group moving frame 32 in the optical axis direction which is greater than the range of movement of the cam ring 29 in the optical axis direction is achieved. Namely, the length of the cam ring 29 in the optical axis direction can be reduced while securing the range of movement of the second lens group LG2 in the optical axis direction.

Another feature of the cam mechanism provided in the present embodiment of the zoom lens 10 between the cam ring 29 and the second lens group moving frame 32 will be discussed hereinafter.

As shown in FIGS. 6 and 7, the trajectory (diagram) of each front cam groove CF defines a normal-width section CF-G in which the associated front cam follower NF is engaged with substantially no play, a wide-width section CF-M which is formed to be slightly greater in width than the normal-width section CF-G so that the associated front cam follower NF can be engaged in the wide-width section CF-M with slight play (i.e., loosely engaged), and an off-groove section CF-K in which no cam groove is actually formed but lies on the associated reference cam diagram Q. In each front cam groove CF, two wide-width sections CF-M are provided at both ends of the normal-width section CF-G, respectively. One of the two wide-width sections CF-M extends between the front end opening R1 (i.e., facing to the off-groove section CF-K) and the normal-width section CF-G, while the other wide-width section CF-M extends between the normal-width section CF-G and a closed end portion (the fourth section Q4 of the reference cam diagram Q) of the front cam groove CF.

In the following descriptions, the former wide-width section CF-M having the front end opening R1 is referred to as the left wide-width section CF-M, and the latter wide-width section CF-M is referred to as the right wide-width section CF-M. The left and right wide-width sections CF-M are respectively connected to the normal-width section CF-G via width transition portions (variant-width portions) CF-V that gradually change the groove width thereof.

Similar to the front cam groove CF, the trajectory of each rear cam groove CR defines a normal-width section CR-G in which the associated rear cam follower NR is engaged with substantially no play; a wide-width section CR-M which is formed to be slightly greater in width than the normal-width section CR-G so that the associated rear cam follower NR can be engaged in the wide-width section CR-M with slight play (i.e., loosely engaged); and an off-groove section CR-K in which no cam groove is actually formed though which lies on the associated reference cam diagram Q. In each rear cam groove CR, two wide-width sections CR-M are provided at both ends of the off-groove section CR-K, respectively. One of the two wide-width sections CR-M extends between the normal-width section CR-G and the rear end opening R2 (one end of the off-groove section CR-K), and the other wide-width section CR-M extends between the rear end opening R3 (the other end of the off-groove section CR-K) and a closed end portion (the fourth section Q4 of the reference cam diagram Q) of the rear cam groove CR.

In the following descriptions, the former wide-width section CR-M having the rear end opening R2 is referred to as the left wide-width section CR-M, and the latter wide-width section CF-M having the rear end opening R3 is referred to as the right wide-width section CR-M. The left wide-width section CR-M is connected to the normal-width section CR-G via a width transition portion (variant-width portion) CR-V that gradually changes the groove width thereof.

"CF-Z" shown in FIG. 6 designates the zoom section (photographing range) of the front cam groove CF from the wide-angle extremity position W to the telephoto extremity position T, and "CR-Z" shown in FIG. 6 designates the zoom section (photographing range) of the rear cam groove CR from the wide-angle extremity position W to the telephoto extremity position T. The zoom section CF-Z of each front cam groove CF includes a major part of the normal-width section CF-G, the left wide-width section CF-M and the off-groove section CF-K. The zoom section CR-Z of each rear cam groove CR includes the normal-width section CR-G, the left wide-width section CR-M and part of the off-groove section CR-K.

More precisely, in the zoom section CF-Z of each front cam groove CF, a portion thereof which extends from the wide-angle extremity position W over almost the entire range of the second section Q2 of the associated reference cam diagram Q is formed as the normal-width section CF-G, and another portion of the zoom section CF-Z of each front cam groove CF in the vicinity of the front end opening R1 thereof that opens on a front end surface of the cam ring 29 is formed as the left wide-width section CF-M. Another portion of the zoom section CF-Z of each front cam groove CF which extends from the front end opening R1 that corresponds to the front end portion of the wide-width section CF-M to the telephoto extremity position T is formed as the off-groove portion CR-K. In the zoom section CR-Z of each rear cam groove CR, a portion of the zoom section CR-Z of each rear cam groove CR which extends from the wide-angle extremity position W to the rear end opening R2 is formed as a part of the off-groove portion CR-K, in which no cam groove exists, another portion of the zoom section CR-Z which extends from the rear end opening R2 to a midpoint in the second section Q2 of the associated reference cam diagram Q is formed as the left wide-width section CR-M, and another portion of the zoom section CR-Z which extends from the left wide-width section CR-M to the telephoto extremity position T is formed as the normal-width section CR-G.

When the zoom lens 10 is set at the wide-angle extremity, the position of the second lens group moving frame 32 is controlled via the engagement of each front cam follower NF with the associated front cam groove CF since each rear cam follower NR is disengaged from the associated rear cam groove CR on the rearward side of the cam ring 29, as described above. In this respect, each cam follower NF is engaged with the normal-width section CF-G of the associated front cam groove CF when positioned at the wide-angle extremity position W, and accordingly, the position of the second lens group moving frame 32 can be precisely controlled with substantially no occurrence of backlash or play between each front cam follower NF and the associated front cam groove CF.

A rotation of the cam ring 29 in the lens barrel advancing direction from the wide-angle extremity position toward the telephoto extremity position causes each front cam follower NF to move forward in the normal-width section CF-G of the associated front cam groove CF. On the other hand, this rotation of the cam ring 29 causes each rear cam follower NR to enter the associated rear cam groove CR through the rear end opening R2 to move forward in this rear cam groove CR; however, the range of movement of each rear cam follower NR at this movement corresponds to the left wide-width section CR-M of the associated rear cam groove CR, and each rear cam follower NR is in a state of being loosely engaged in the associated rear cam groove CR. Therefore, even though each front cam follower NF and the rear cam follower NR positioned therebehind are simultaneously engaged in the associated cam grooves CF and CR, respectively, the actual position control for the second lens group moving frame 32 is performed via the engagement between each front cam follower NF and the normal-width section CF-G of the associated front cam groove CF, and accordingly, the engagement between each rear cam follower NR and the associated rear cam groove NR does not interfere with the guidance by this engagement between each front cam follower NF and the normal-width section CF-G of the associated front cam groove CF.

Figure 10:
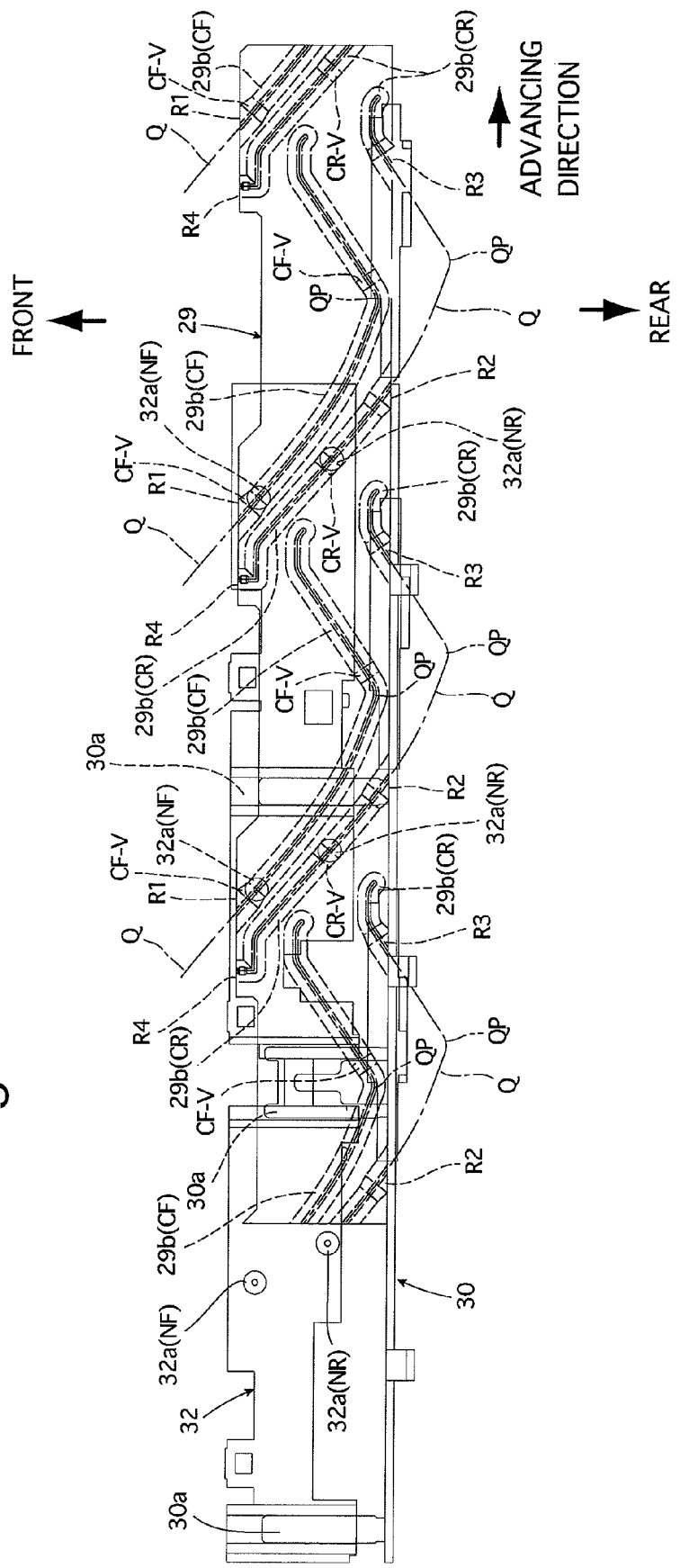
FIG. 10 is a developed view of the cam ring, the second lens group moving frame and the second linear guide ring, showing a state where each of front and rear cam followers is positioned in the close vicinity of the boundary between the normal-width section and the wide-width section in the zoom section of the associated cam groove in the zoom range of the zoom lens between the wide-angle extremity and the telephoto extremity.
Figure 11:
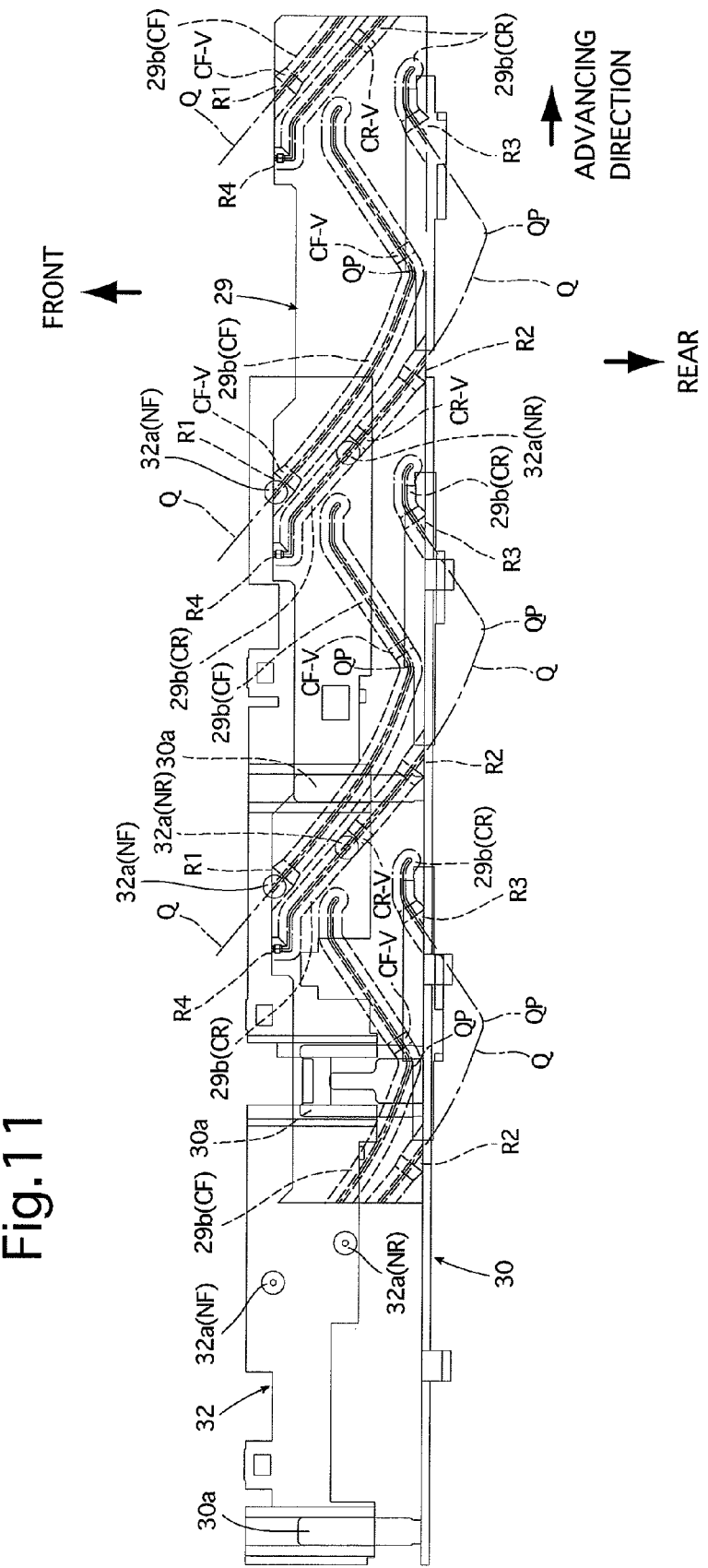
FIG. 11 is a developed view of the cam ring, the second lens group moving frame and the second linear guide ring, showing a state, different from the state shown in FIG. 10, where each front cam follower is positioned in the wide-width section of the associated front cam groove while each rear cam follower is positioned in the normal-width section of the associated rear cam groove.

A further rotation of the cam ring 29 toward the telephoto extremity position to the position shown in FIG. 10 causes each front cam follower NF to approach the left wide-width section CF-M of the associated front cam groove CF and simultaneously causes each rear cam follower NR to approach the normal-width section CR-G of the associated rear cam groove CR. Thereafter, a further rotation of the cam ring 29 toward the telephoto extremity position from the position shown in FIG. 10 causes each front cam follower NF to move into the left wide-width section CF-M from the normal-width section CF-G of the associated front cam groove CF as shown in FIG. 11, thus causing each front cam follower NF to be loosely engaged in the associated front cam groove CF. On the other hand, this rotation of the cam ring 29 causes each rear cam follower NR to exit from the left wide-width section CR-M of the associated rear cam groove CR to be engaged in the normal-width section CR-G of the associated rear cam groove CR, thus causing each rear cam follower NR to be engaged in the associated rear cam groove CR with backlash and play being eliminated therebetween. This leads to a state where the actual position control for the second lens group moving frame 32 is performed via the engagement between each rear cam follower NR and the normal-width section CR-G of the associated rear cam groove CR. Namely, the main constituents for the position control of the second lens group moving frame 32 are shifted from the front cam grooves CF to the rear cam grooves CR. Upon this shifting operation, each front cam follower NF is smoothly guided by the width transition portion CF-V provided between the normal-width section CF-G and the left wide-width section CF-M, and each rear cam follower NR is smoothly guided by the width transition portion CR-V provided between the normal-width section CR-G and the left wide-width section CR-M.

Note that the zoom lens 10 has a plurality of stepwise focal lengths between the wide-angle extremity and the telephoto extremity which are predetermined to stop the cam ring 29 stepwise; however, the zoom lens 10 is controlled so that neither the width transition portion CF-V at the boundary between the normal-width section CF-G and the left wide-width section CF-M nor the width transition portion CR-V at the boundary between the normal-width section CR-G and the left wide-width section CR-M is used as a variable focal length range for the plurality of stepwise focal lengths (namely, rotation of the cam ring 29 is controlled so that each front cam followers NF and each rear cam followers NR do not stop in the width transition portion CF-V of the associated front cam groove CF and the width transition portion CR-V of the associated rear cam groove CR, respectively). Accordingly, substantially no adverse effect is exerted on photographing performance of the zoom lens 10 even if the width of each cam groove changes in the zoom section (CF-Z and CR-Z).

A further rotation of the cam ring 29 toward the telephoto extremity position from the state shown in FIG. 11 causes each front cam follower NF to be disengaged from the associated front cam groove CF through the front end opening R1 thereof. On the other hand, each rear cam follower NR is guided by the normal-width section CR-G of the rear cam groove CR until reaching the telephoto extremity positions T shown in FIG. 9. Accordingly the position of the second lens group moving frame 32 in the optical axis direction can be precisely determined (controlled) with substantially no occurrence of backlash or play between each rear cam follower NR and the associated rear cam groove CR.

As described above, the present embodiment of the cam mechanism is configured so that variations are given to the groove widths of the six inner cam grooves 29b of the cam ring 29 by providing each front cam groove CF and each rear cam groove CR with the wide-width section (left wide-width section) CF-M and the wide-width section (left wide-width section) CR-M, respectively, and so that, when one cam follower (front or rear cam follower NF or NR) of each pair of cam followers is engaged in the normal-width section of one of the associated front and rear cam grooves CF and CR, the other cam follower of the pair of cam followers is loosely engaged in the wide-width section of the other of the associated front and rear cam grooves CF and CR or disengaged therefrom. Namely, the actual and precise position control for the second lens group moving frame 32 is always performed by either the engagement of each front cam follower NF with the associated front cam groove CF or the engagement of each rear cam follower NR with the associated rear cam groove CR. According to this structure, the position control for the second lens group moving frame 32 does not have to be strictly controlled simultaneously and mutually by both the three front cam grooves CF and the three rear cam grooves CR (and the three front cam followers NF and the three rear cam followers NR), which makes it possible to ease (reduce) the accuracy control of the overall cam mechanism while enhancing the accuracy of guiding the second lens group moving frame 32 by the engagement of each cam groove (the normal-width section thereof) with the associated cam follower.

Although each front cam follower NF and each rear cam follower NR are respectively engaged in the associated front cam groove CF and the associated rear cam groove CR when the zoom lens 10 is in the lens barrel accommodated state, all the lens barrel accommodating ranges of the three front cam grooves CF and the three rear cam groove CR, in which the three front cam followers NF and the three rear cam followers NR are engaged, are formed as the right wide-width sections CF-M and the right wide-width sections CR-M, in which the three front cam followers NF and the three rear cam followers NR are loosely engaged, respectively, as shown in FIG. 7. No problem arises even if the lens barrel accommodating ranges of the three front cam grooves CF and the three rear cam groove CR are formed as the right wide-width sections CF-M and the right wide-width sections CR-M, respectively, since no picture taking (photography) is carried out in the lens barrel accommodated state of the zoom lens 10 and since the positional accuracy is not required to be as strict as the positional accuracy required during zooming, focusing or during a photographing operation. Additionally, since all the three front cam grooves CF and the three rear cam grooves CR are partly formed as the three right wide-width sections CF-M and the three right wide-width sections CR-M, respectively, the tolerance of the accuracy of engagement of each inner cam groove 29b with the associated cam follower 32a is great, which eases (reduces) the accuracy control of each inner cam groove 29b and the associated cam follower 32a.

As shown in FIGS. 6 and 7, a portion of each front cam groove CF which extends from the closed end portion (the fourth section Q4) that includes the lens barrel accommodating range to a point in the vicinity of the second inflection point QP is formed as the right wide-width section CF-M. Similar to the width transition portion CF-V that is provided in the aforementioned zoom section CF-Z of each front cam groove CF, the width transition portion (variant-width portion) CF-V that gradually changes the groove width thereof is formed between each right wide-width section CF-M and the associated wide-width section CF-G. A rotation of the cam ring 29 in the lens barrel advancing direction from the lens barrel accommodated state shown in FIG. 7 causes each rear cam follower NR to be disengaged from the associated rear cam groove CR rearward through the rear end opening R3. During this operation, a state where each front cam follower NF and each rear cam follower NR are not engaged in the normal-width section CF-G of the associated front cam groove CF and the normal-width section CR-G of the associated rear cam groove CR, respectively, continues because each front cam follower NF continues to move in the right wide-width section CF-M of the associated front cam groove CF. However, substantially no adverse effect is exerted on photographing performance of the zoom lens 10 since this state occurs in mid-course of the transition (transition state) from the lens barrel accommodated state of the zoom lens 10 to the zoom range (ready-to-photograph state) thereof and since no photographing operation is carried out during this transition state. Similar to the lens barrel accommodated state, this structure makes it possible to ease the accuracy control of the overall cam mechanism in the transition state of the zoom lens 10. In addition, loads on rotation of the cam ring 29 can be reduced during the transition state of the zoom lens 10 by the structure of guiding each front cam follower NF by the right wide-width section CF-M of the associated front cam groove CF and disengaging each rear cam follower NR from the associated rear cam groove CR. Before the zoom lens 10 is set at the wide-angle extremity shown in FIG. 8 from the lens barrel accommodated state, each front cam follower NF enters the normal-width section CF-G via the width transition portion CF-V from the right wide-width section CF-M so that the position of the second lens group moving frame 32 in the optical axis direction can be precisely controlled.

The two (left and right) wide-width sections CF-M of each front cam groove CF and the two (left and right) wide-width sections CR-M of each rear cam groove CR also have the capability of making the associated front cam follower NF and the associated rear cam follower NR, which are disengaged when the zoom lens 10 is in a usage state, re-engage smoothly in the associated front cam groove CF and the associated rear cam groove CR, respectively. As described above, in the lens barrel operating range between the lens barrel accommodated state shown in FIG. 7 and the telephoto extremity state shown in FIG. 9, each front cam follower NF is engaged in and disengaged from the associated front cam groove CF through the front end opening R1 and each rear cam follower NR is engaged in and disengaged from the associated rear cam groove CR through the rear end opening R2 or R3. In addition, as shown in FIGS. 6 and 7, in all of the front and rear cam grooves CF and CR also, a portion of each front cam groove CF in the vicinity of the front end opening R1 is formed as the left wide-width section CF-M while portions of each rear cam groove CR in the vicinity of the rear end openings R2 and R3 are formed as the left wide-width section CR-M and the right wide-width section CR-M, respectively. In other words, when each front cam follower NF enters the associated front cam groove CF through the front end opening R1, each front cam follower NF always enters the left wide-width section CF-M of the associated front cam groove CF, not the normal-width section CF-G of the associated front cam groove CF. When each rear cam follower NR enters the associated rear cam groove CR through the rear end opening R2 or R3, each rear cam follower NR always enters the left or right wide-width section CR-M of the associated rear cam groove CR, not the normal-width section CR-G of the associated rear cam groove CR. More specifically, in each of the three rear cam grooves CR, each of the two (left and right) wide-width sections CR-M is divided into two sections: a first wide-width section M1 which is slightly greater in width than the normal-width section CR-G and a second wide-width section M2 which is slightly greater in width than the first wide-width section M1, and the second wide-width section M2 that is the greatest in width and is continuous with the adjacent rear end opening R2 or R3. Additionally, also in each of the three front cam grooves CF, the left wide-width section CF-M (a second wide-width section M2) in the vicinity of the front end opening R1 is slightly greater in width than the right wide-width section CF-M (a first wide-width section M1) that extends from the fourth section Q4 (that includes the lens barrel accommodating range) to the third section Q3 of the associated reference cam diagram Q. This structure (i.e. providing the second wide-width section M2 to face the end openings R1, R2 and R3) prevents each front cam follower NF and each rear cam follower NR which are in a state of being respectively disengaged from the associated front cam groove CF and the associated rear cam groove CR from accidentally abutting against an end surface of the cam ring 29 upon each front cam follower NF and each rear cam follower NR entering the associated front cam groove CF and the associated rear cam groove CR, respectively, thus allowing each front cam follower NF and each rear cam follower NR to enter the associated front cam groove CF and the associated rear cam groove CR, respectively, in a smooth manner even if a slight precision error exists.

Figure 12:
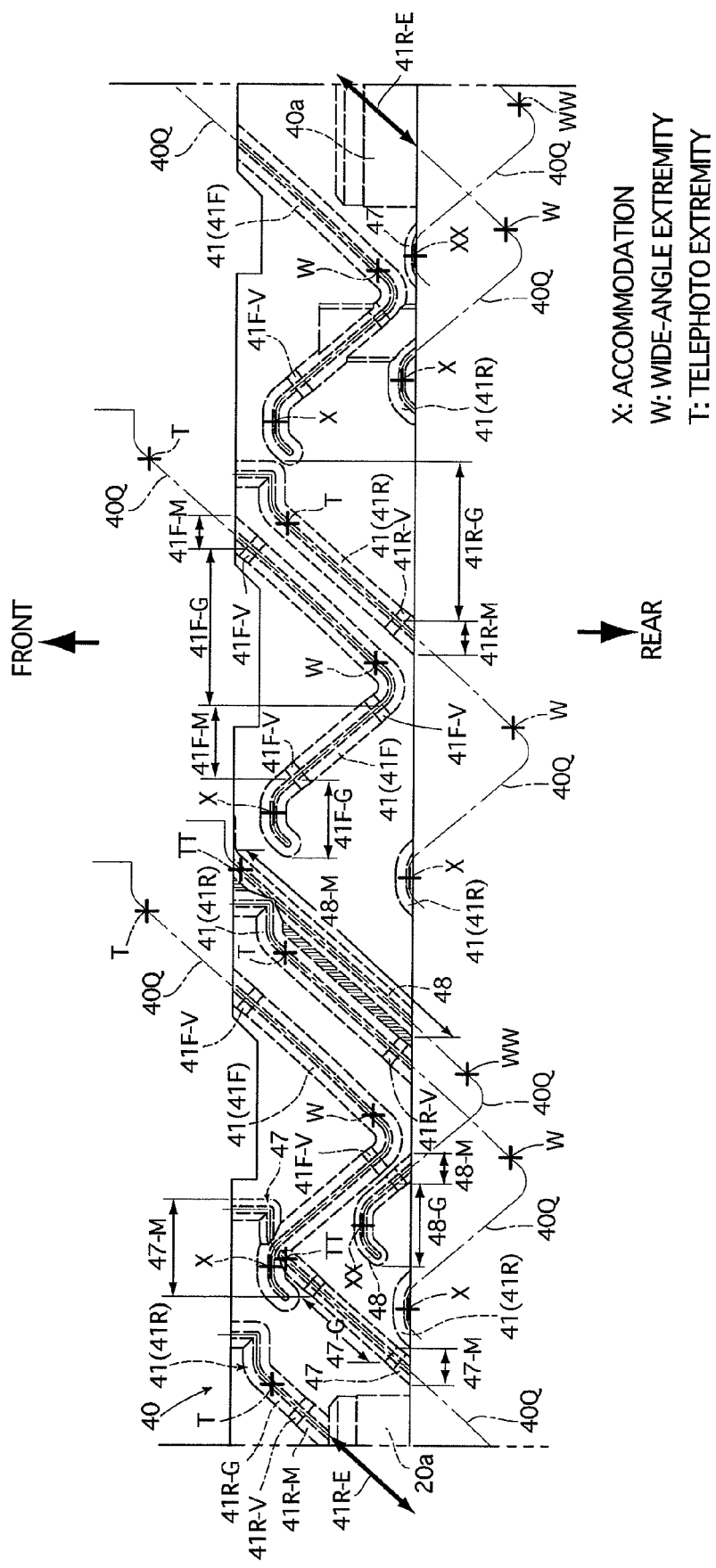
FIG. 12 is a developed view of a cam ring in a second embodiment of the zoom lens.

FIGS. 12 through 16 show a cam ring 40 and associated elements in a second embodiment of the zoom lens. The cam ring 40, which is shown as a developed view in FIG. 12, is provided on an inner peripheral surface of the cam ring 40 with six cam grooves 41. Similar to the six inner cam grooves 29b in the first embodiment of the zoom lens 10, the six cam grooves 41 are formed on six reference cam diagrams 40Q having the same shape and size and consist of two types of cam grooves: a set of three front cam grooves 41F and a set of three rear cam grooves 41R formed behind the set of three front cam grooves 41F in the optical axis direction, respectively. The circumferential positions of each pair of one front cam groove 41F and associated one rear cam groove 41R are different each other in order to achieve a reduction in length of the cam ring 40 in the optical axis direction.

Figure 13:
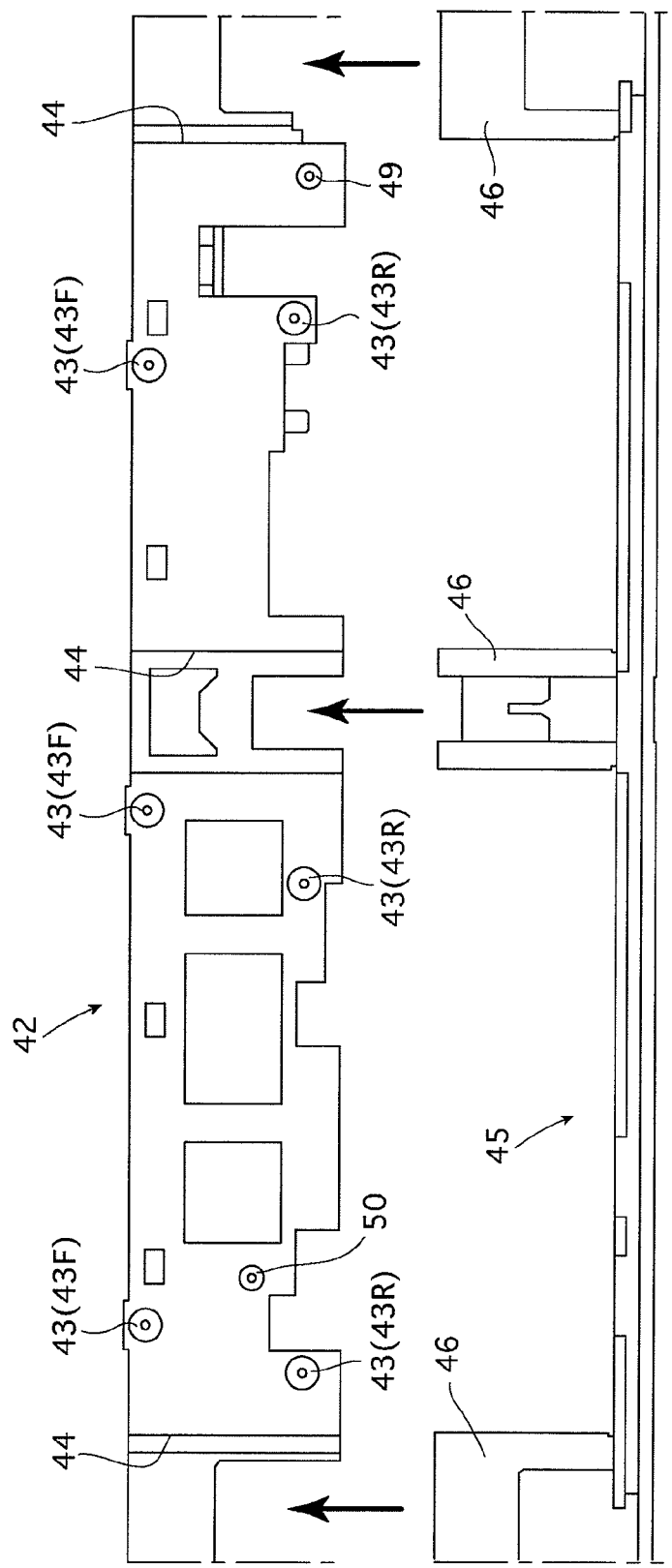
FIG. 13 is a developed view of a lens moving frame and a linear guide ring in the second embodiment of the zoom lens.
Figure 14:
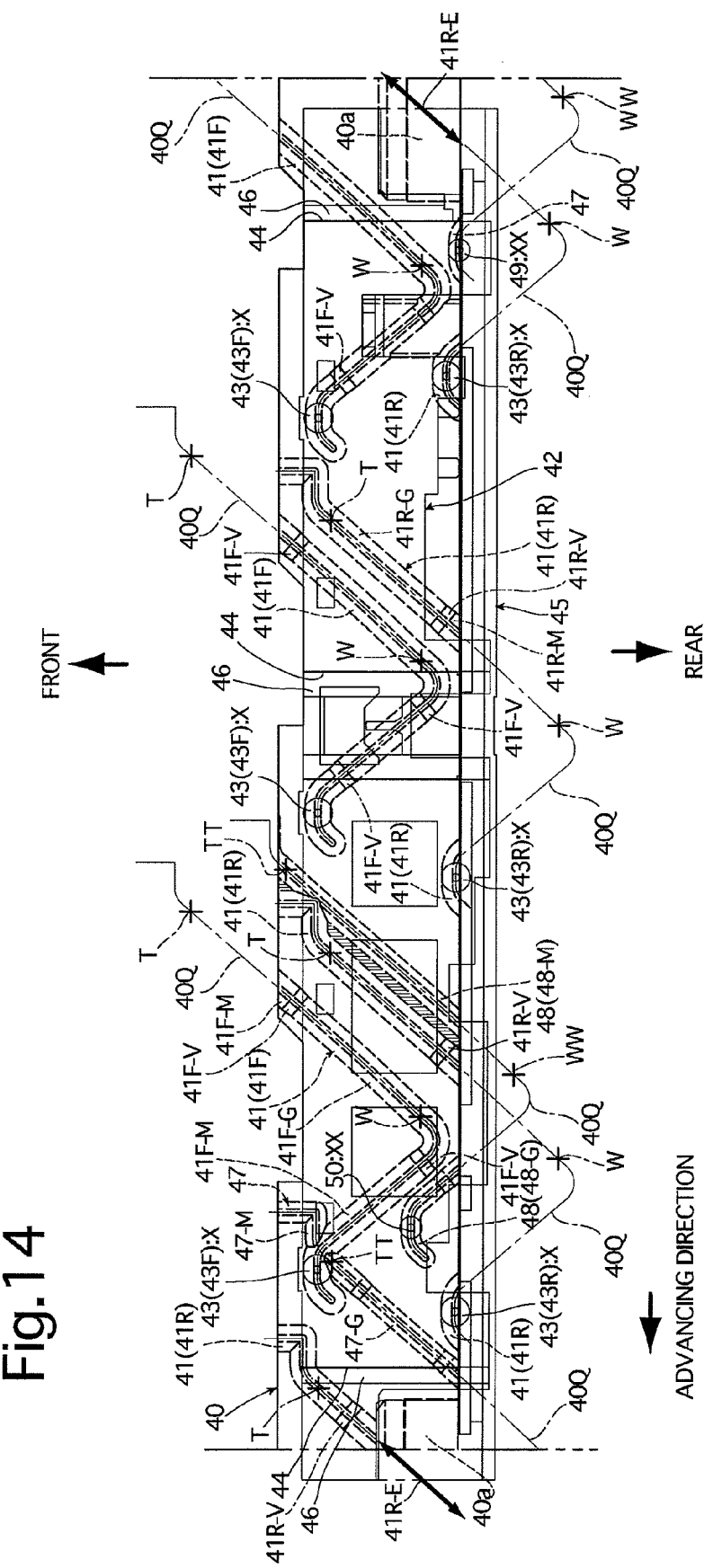
FIG. 14 is a developed view of the cam ring, the lens moving frame and the linear guide ring in the second embodiment of the zoom lens, showing the lens barrel accommodated state of the zoom lens.
Figure 15:
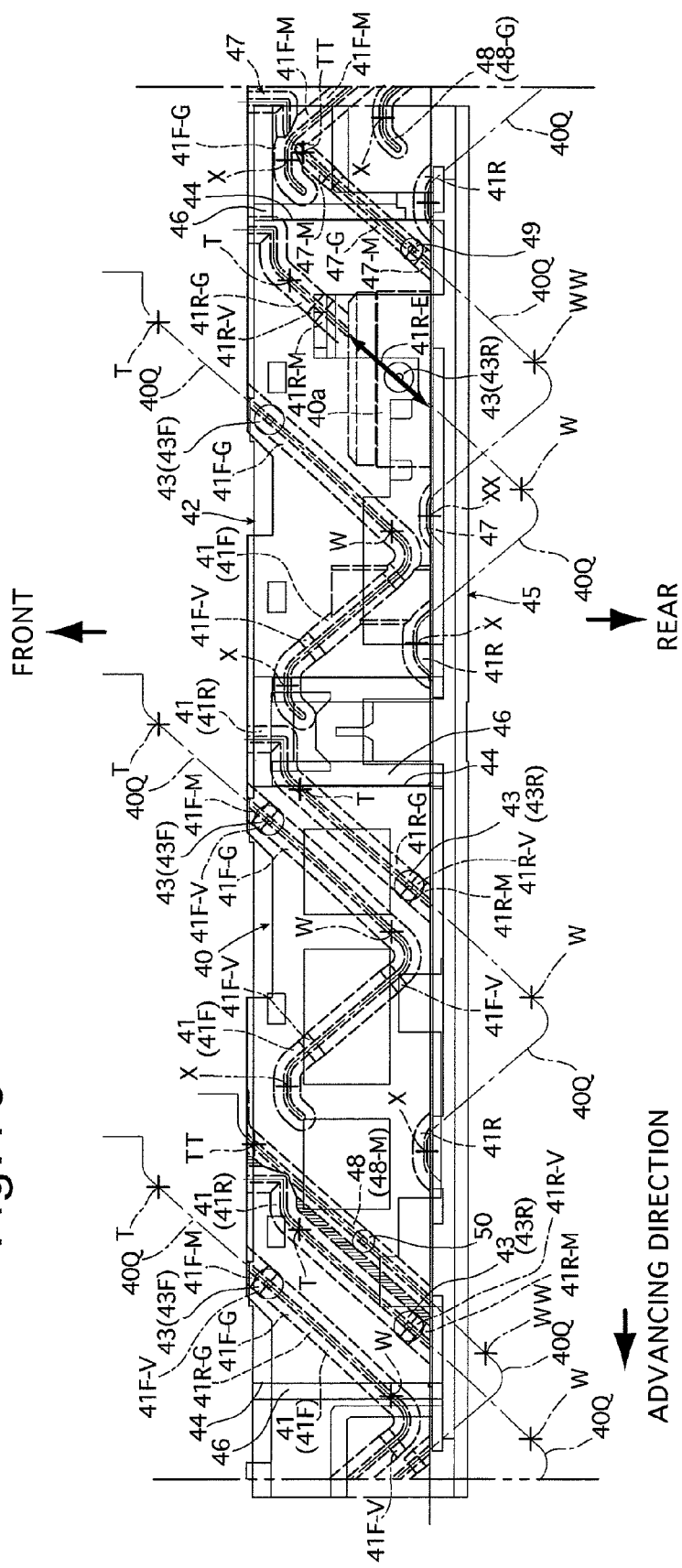
FIG. 15 is a developed view of the cam ring, the lens moving frame and the linear guide ring, showing a state where one of the rear cam followers comes out of the associated rear cam groove to be positioned in a recessed portion formed on the cam ring at a midpoint in the zoom range of the second embodiment of the zoom lens.
Figure 16:
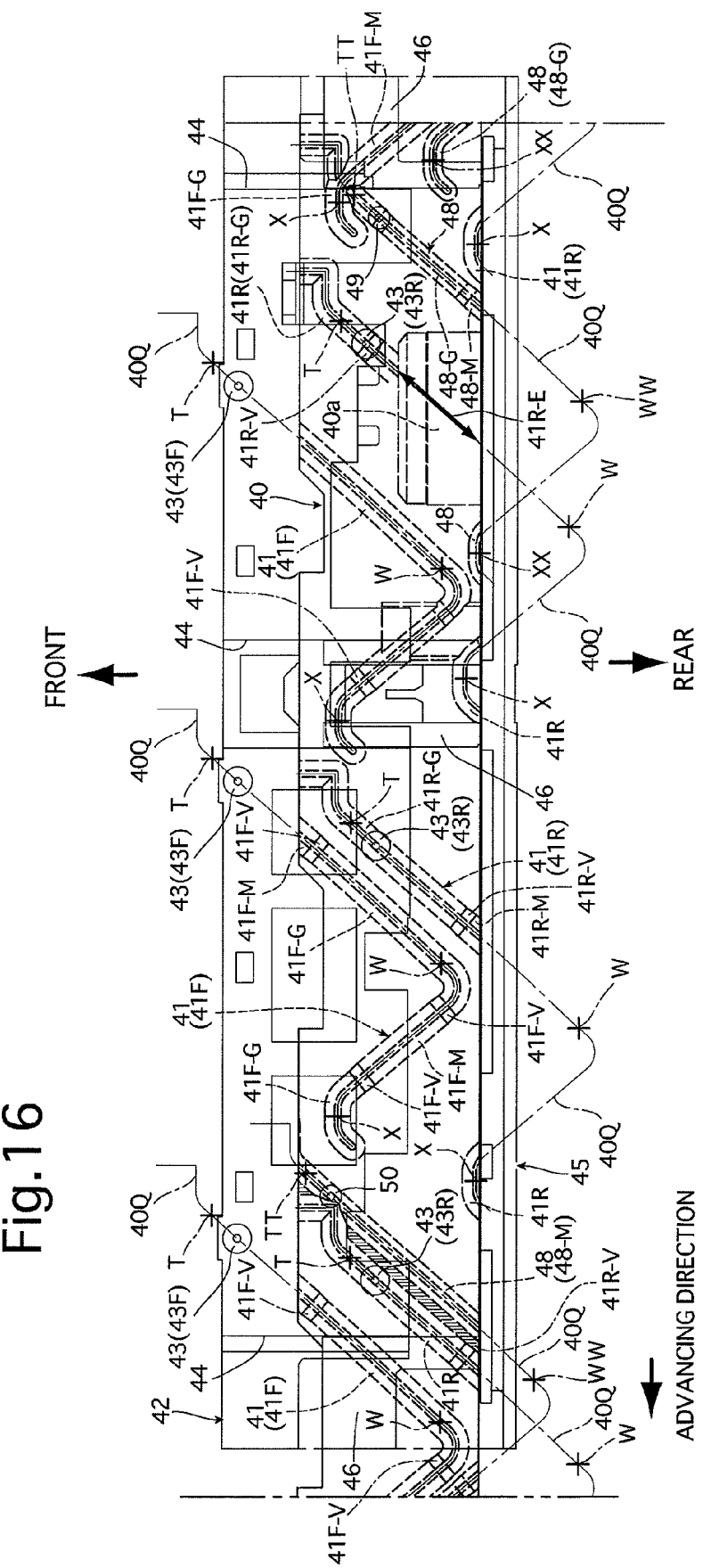
FIG. 16 is a developed view of the cam ring, the lens moving frame and the linear guide ring, showing a state where a lens barrel advancing operation has been performed to further advance the zoom lens from the state shown in FIG. 15, so that the rear cam follower which is disengaged from the associated rear cam groove in the state shown in FIG. 15 is engaged with the associated rear cam groove.

The second embodiment of the zoom lens is provided with a lens moving frame (driven member) 42 shown in FIG. 13 which holds a lens group (not shown), and six cam followers 43 which are respectively engaged in the six cam grooves 41 are formed on an outer peripheral surface of the lens moving frame 42. Similar to the six cam followers 32a in the first embodiment of the zoom lens 10, the six cam followers 43 include two types of cam followers: a set of three front cam followers 43F that are formed at different circumferential positions, and a set of three rear cam followers 43R that are formed at different circumferential positions behind the set of three front cam followers 43F in the optical axis direction. The lens moving frame 42 is provided with three linear guide grooves 44 each having a pair of parallel guide surfaces parallel to an optical axis (not shown) of the zoom lens. The second embodiment of the zoom lens is provided with a linear guide ring 45 shown in FIG. 13 having three linear guide keys 46 which are respectively engaged in the three linear guide grooves 44 of the lens moving frame 42 to be slidable in the optical axis direction. The linear guide ring 45 is prevented from rotating about the optical axis, and the lens moving frame 42 is guided in a manner to be prevented from rotating, and allowed to move only linearly in the optical axis direction by the engagement of the linear guide ring 45 with the three linear guide keys 46. In FIGS. 14 through 16, portions of the lens moving frame 42 and the linear guide ring 45, which are positioned below the cam ring 40 with respect to FIGS. 14 through 16, are shown by solid lines (not distinguished by broken lines or the like) for the purpose of illustration, even though in reality these portions would not be visible.

Each front cam follower 43F is engaged in the associated front cam groove 41F while each rear cam follower 43R is engaged in the associated rear cam groove 41R. In FIGS. 12, and 14 through 16, the symbols "X", "W" and "T" which are given on each reference cam diagram 40Q indicate that the position of the associated cam follower 43 when the zoom lens is in the lens barrel accommodated state, when the zoom lens is set at the wide-angle extremity in the zoom range and when the zoom lens is set at the telephoto extremity in the zoom range, respectively. As can be understood from FIG. 12, a front part of each front cam groove 41F on the associated reference cam diagram 40Q is omitted; specifically, each front cam groove 41F does not have a front part thereof on the associated reference cam diagram 40Q which is supposed to extend toward the telephoto extremity side from a midpoint in the zoom range. On the other hand, a rear part of each rear cam groove 41R on the associated reference diagram 40Q is omitted; specifically, each rear cam groove 41R does not have a rear part thereof on the associated reference diagram 40Q which is supposed to extend from the lens barrel accommodating range to a midpoint in the zoom range beyond the wide angle extremity position. A lens barrel accommodating section of the each rear cam groove 41R which includes the lens barrel accommodation position (X) opens on a rear end surface of the cam ring 40. Each rear cam follower 43R is engaged in the associated rear cam groove 41R in a state where each front cam follower 43F is disengaged from the associated front cam groove 41F forward, and each front cam follower 43F is engaged in the associated front cam groove 41F in a state where each rear cam follower 43R is disengaged from the associated rear cam groove 41R rearward.

In addition, each front cam groove 41F is provided with two normal-width sections 41F-G in which the associated front cam follower 43F is engaged with substantially no play to guide the associated front cam follower 43F with precision, and is further provided with two wide-width sections 41F-M which are formed to be slightly greater in width than the normal-width section 41F-G. One of the normal-width sections 41F-G (hereinafter referred to as the left normal-width sections 41F-G) includes a closed end of the front cam groove 41F, and the other of the two normal-width sections 41F-G (hereinafter referred to as the right normal-width sections 41F-G) is positioned between the two wide-width sections 41F-M. One of the two wide-width sections 41F-M (hereinafter referred to as the right wide-width section 41F-M) opens on a front end surface of the cam ring 40, and the other of the two wide-width sections 41F-M (hereinafter referred to as the left wide-width section 41F-M) is positioned between the two (left and right) normal-width sections 41F-G. Each rear cam groove 41R is provided with a normal-width section 41R-G in which the associated rear cam follower 43R is engaged with substantially no play to guide the associated rear cam follower 43R with precision, and a wide-width section 41R-M which is formed to be slightly greater in width than the normal-width section 41R-G. The two normal-width sections 41F-G are smoothly connected to the adjacent two wide-width sections 41F-M via width transition portions 41F-V (variant-width portion), and the normal-width section 41R-G and the wide-width section 41R-M are smoothly connected to each other via a width transition portion 41R-V (variant-width portion).

In the above described structure of the second embodiment of the zoom lens, when each cam follower 43F and 43R is positioned at the wide-angle extremity position (W) on the reference cam diagram Q of the associated cam groove 41F or 41R, each rear cam follower 43R is rearwardly disengaged from the associated rear cam groove 41R while each front cam follower 43F is engaged in the normal-width section 41-F of the associated front cam groove 41F. A rotation of the cam ring 40 toward the telephoto extremity (T) from the wide-angle extremity position causes each front cam follower 43F to be forwardly disengaged from the associated front cam groove 41F through the right wide-width section 41F-M. However, before this disengagement of each front cam follower 43F, each rear cam follower 43R enters the associated rear cam groove 41R through the wide-width section 41R-M on the rear end side of the cam ring 40 to be guided by the associated normal-width section 41R-G. This makes it possible to control the position of the lens moving frame 42 in the optical axis direction with precision over the entire zoom range from the wide-angle extremity to the telephoto extremity.

When each cam follower 43F and 43R is positioned at the lens barrel accommodation position (X) in the associated cam groove 41F or 41R, each rear cam follower 43R is positioned in a portion of the rear cam groove 41R which opens on a rear end surface of the cam ring 40 (i.e., the rear cam follower 43R is substantially disengaged from the rear cam groove 41R), whereas each front cam follower 43F is engaged in the left normal-width section 41F-G of the associated front cam groove 41F so that the position of the lens moving frame 42 in the optical axis direction is controlled with precision. In addition, during the transition (transition state) from the lens barrel accommodation position to the zoom range, each rear cam follower 43R is completely disengaged from the associated rear cam groove 41R rearward while each front cam follower 43F is guided by the left wide-width section 41F-M of the associated front cam groove 41F and subsequently enters the right normal-width section 41F-G thereof in the vicinity of the wide-angle extremity position (W). Since no photographing operation is carried out in the transition state between the lens barrel accommodation position and the zoom range (ready-to-photograph state), a precise accuracy control (which is required during a photographing operation) is not necessary, and loads on rotation of the cam ring 40 can be reduced by the structure of guiding each front cam follower 43F by the left wide-width section 41F-M of the associated front cam groove 41F and disengaging each rear cam follower 43R from the associated rear cam groove 41R.

The relationship between each front cam groove 41F and the associated rear cam groove 41R is substantially the same as the relationship between each front cam groove CF and the associated rear cam groove CR of the previous embodiment of the zoom lens. However, the cam ring 40 is provided on an inner peripheral surface thereof with a recessed portion 40a which allows a part of a lens frame (not shown) corresponding to the second lens frame 34 of the previous embodiment of the zoom lens to enter the recessed portion 40a, and one of the three rear cam grooves 41R overlaps the recessed portion 40a, so that this overlapping rear cam groove 41R has a groove-omitted portion 41R-E in which no part of the rear cam groove 41R is formed even though on an inner peripheral surface of the cam ring 40. The cam ring 40 is provided thereon with a first supplemental cam groove (discontinuous cam groove) 47 and a second supplemental cam groove (discontinuous cam groove) 48 which supplement the groove-omitted portion 41R-E. In FIGS. 12 and 14 through 16, the boundary between the second supplemental cam groove 48 and the rear cam groove 41R adjacent thereto is hatched for the sake of clarity.

The lens moving frame 42 is provided on an outer peripheral surface thereof with a first supplemental cam follower 49 and a second supplemental cam follower 50 which are engaged in the first supplemental cam groove 47 and the second supplemental cam groove 48, respectively. Similar to the relationship between the six cam grooves 41 and the six cam followers 43, the symbol "XX", "WW" and "TT" which are given on the reference cam diagram 40Q of the first supplemental cam groove 47 indicate that the position of the first supplemental cam follower 49 when the zoom lens is in the lens barrel accommodated state, when the zoom lens is set at the wide-angle extremity in the zoom range and when the zoom lens is set at the telephoto extremity in the zoom range, respectively, and the symbol "XX", "WW" and "TT" which are given on the reference cam diagram 40Q of the second supplemental cam groove 48 indicate that the position of the second supplemental cam follower 50 when the zoom lens is in the lens barrel accommodated state, when the zoom lens is set at the wide-angle extremity in the zoom range and when the zoom lens is set at the telephoto extremity in the zoom range, respectively.

The first supplemental cam groove 47 and the second supplemental cam groove 48 are each shaped by tracing a reference cam diagram 40Q in a manner similar to each cam groove 41 and formed at different positions from those of the three front cam grooves 41F and the three rear cam grooves 41R both in the optical axis direction and a circumferential direction (rotational direction) so as not to overlap the recessed portion 40a. Similar to each rear cam groove 41R, the first supplemental cam groove 47 is formed into a short-length cam groove, namely, the first supplemental cam groove 47 does not have a rear part thereof on the associated reference cam diagram 40Q which is supposed to extend from the lens barrel accommodation position (XX) to a midpoint in the zoom range beyond the wide angle extremity position (WW). As shown in FIG. 12, a lens barrel accommodating section of the first supplemental cam groove 47 which includes the lens barrel accommodation position (XX) opens on the rear end surface of the cam ring 40. Similar to the first supplemental cam groove 47, the second supplemental cam groove 48 is formed so as not to include a rear part thereof on the associated reference cam diagram 40Q which includes the wide angle extremity position (WW); however, the second supplemental cam groove 48 is positioned slightly closer to the front end of the cam ring 40 than the first supplemental cam groove 47 in the optical axis direction, and a lens barrel accommodating section of the second supplemental cam groove 48, which includes the lens barrel accommodation position (XX), does not open on the rear end surface of the cam ring 40. In addition, the first supplemental cam groove 47 is provided with a normal-width section 47-G in which the first supplemental cam follower 49 is engaged with substantially no play to guide the first supplemental cam follower 49 with precision, and is further provided at both ends of the normal-width section 47-G with two (front and rear) wide-width sections 47-M, each of which is formed to be slightly greater in width than the normal-width section 47-G so that the first supplemental cam follower 49 can be loosely engaged in each of the two wide-width sections 47-M. The second supplemental cam groove 48 is provided with a normal-width section 48-G in which the second supplemental cam follower 50 is engaged with substantially no play to guide the second supplemental cam follower 50 with precision, and is further provided, between the normal-width section 48-G and the front end opening of the second supplemental cam groove 48 that opens on a front end surface of the cam ring 40, with two (left and right) wide-width sections 48-M, each of which is formed to be slightly greater in width than the normal-width section 48-G so that the second supplemental cam follower 50 is loosely engaged in the wide-width sections 48-M.

Each of the first supplemental cam groove 47 and the second supplemental cam groove 48 is narrower in width than each cam groove 41. For instance, the first supplemental cam groove 47 intersects an adjacent one of the three front cam grooves 41F at a position slightly in front of the telephoto extremity position (TT) thereof; however, even at this intersecting portion, the front wide-width section 47-M (the upper wide-width section 47-M with respect to FIGS. 12 and 14 through 16) is narrower in width than the wide-width section 41F-M of this adjacent front cam groove 41F.

The functions of the first supplemental cam groove 47 and the second supplemental cam groove 48 will be hereinafter discussed with reference to FIGS. 14 through 16. FIG. 14 shows the lens barrel accommodated state, in which the three front cam followers 43F are respectively engaged in the left normal-width sections 41F-G of the three front cam grooves 41F at the lens barrel accommodation position (X), while the second supplemental cam follower 50 is engaged in the normal-width section 48-G of the second supplemental cam groove 48 at the lens barrel accommodation position (XX). In this state, each of the three rear cam followers 43R is positioned in the lens barrel accommodating section (the lens barrel accommodation position X) of the associated rear cam groove 41R which opens on the rear end surface of the cam ring 40, while the first supplemental cam follower 49 is positioned in the lens barrel accommodating section (the lens barrel accommodation position XX) of the first supplemental cam groove 47 which opens on the rear end surface of the cam ring 40.

Rotating the cam ring 40 in the lens barrel advancing direction from the lens barrel accommodated state causes each front cam follower 43F to move in the associated front cam groove 41F, and thereupon causes one of the three front cam followers 43F to pass the intersection between the first supplemental cam groove 47 and the adjacent front cam groove 41F. Since this front cam groove 41F is greater in width than the first supplemental cam groove 47 (the front wide-width portion 47-M thereof) as described above, there is no possibility of the specific front cam follower 43F being accidentally disengaged from the associated front cam groove 41F to enter the first supplemental cam groove 47. However, to achieve smoother movement, in the vicinity of the intersection between the first supplemental cam groove 47 and the adjacent front cam groove 41F, the second supplemental cam follower 50 is guided by the normal-width section 48-G of the second supplemental cam groove 48.

Further rotating the cam ring 40 in the lens barrel advancing direction causes the second supplemental cam follower 50 to be disengaged from the second supplemental cam groove 48 rearward through the left wide-width section 48-M. When the cam ring 40 is at the wide-angle extremity position thereof, the first supplemental cam follower 49 is rearwardly disengaged from the first supplemental cam groove 47 while the second supplemental cam follower 50 is rearwardly disengaged from the second supplemental cam groove 48, so that the lens moving frame 42 is controlled via the engagement between the three cam followers 43F and the front cam grooves 41F.

Further rotating the cam ring 40 in the lens barrel advancing direction from the wide-angle extremity position causes each front cam follower 43F to be forwardly disengaged from the associated front cam groove 41F, which in turn causes each rear cam follower 43R to be engaged in the normal-width section 41R-G of the associated rear cam groove 41R as described above. At this stage, as shown in FIG. 15, one of the three rear cam followers 43R (the right rear cam follower 43R among the three rear cam followers 43R with respect to FIG. 15; hereinafter referred to as the third rear cam follower 43R) passes through a portion (the groove-omitted portion 41R-E of one of the rear cam grooves 41R) of the cam ring 40 in which the recessed portion 40a is formed, and accordingly, the timing of engagement of the third rear cam follower 43R with the associated rear cam groove 41R is behind the timing of engagement of either of the remaining two rear cam followers 43R with the associated rear cam groove 41R. At this stage, a state where the lens moving frame 42 is held at three different points in a circumferential direction is maintained by the engagement of the first supplemental cam follower 49 with the normal-width section 47-G of the first supplemental cam groove 47 that is formed in the vicinity of the recessed portion 40a, instead of the engagement of the third rear cam follower 43R with the associated rear cam groove 41R that are engaged with each other with a delay.

Further rotating the cam ring 40 in the lens barrel advancing direction from the state shown in FIG. 15 causes the third rear cam follower 43R, which is engaged with the associated rear cam groove 41R with a delay due to the presence of the recessed portion 40a (the groove-omitted portion 41R-E), to be engaged with the associated rear cam groove 41R (the normal-width section 41R-G thereof) and concurrently causes the first supplemental cam follower 49 to move in the first supplemental cam groove 47 from the normal-width section 47-G to the front wide-width section 47-M as shown in FIG. 16.

Namely, over the entire zoom range from the lens barrel accommodated state, the lens moving frame 42 is supported by the engagement of a set of three cam followers and a set of three cam grooves at all occasions, which are arranged at different positions at least in a circumferential direction. Specifically in the zoom range, the supporting points for the lens moving frame 42 change in the following manner: the three front cam grooves 41F (the normal-width sections 41F-G thereof) and the three front cam followers 43F (as three combinations of front cam grooves and front cam followers) are respectively engaged with each other in the vicinity of the wide-angle extremity position; the three rear cam grooves 41R (the normal-width sections 41R-G thereof) and the three rear cam followers 43R (as three combinations of rear cam grooves and rear cam followers) are respectively engaged with each other in the vicinity of the telephoto extremity position; and two of the three rear cam grooves 41R (the normal-width sections 41R-G) and the associated two rear cam followers 43R (as two combinations of rear cam grooves and rear cam followers) are respectively engaged with each other while the first supplemental cam groove 47 (the normal-width section 47-G thereof) and the first supplemental cam follower 49 (as a combination of a cam groove and a cam follower) are engaged with each other in a midpoint between the wide-angle extremity position and the telephoto extremity position. This structure makes it possible to support and guide the lens moving frame 42 without tilting even with a part of one of the three rear cam grooves 41R having the groove-omitted portion 41R-E due to formation of the recessed portion 40a. Although the second supplemental cam follower 50 is engaged in the second supplemental cam groove 48 in the zoom range as shown in FIGS. 15 and 16, priority is given to the guide function of a combination of one rear cam groove 41R (the normal-width section 41R-G thereof) adjacent to the second supplemental cam groove 48 which corresponds to the zoom range totally corresponds to the range of formation of the wide-width section 48-M, in which the second supplemental cam follower 50 is loosely engaged.

As can be understood from the above described second embodiment of the zoom lens, in the cam mechanism according to the present invention, it is possible to add the first supplemental cam groove 47 (and the second supplemental cam groove 48) depending on the arrangement of each front cam groove 41F and the rear inner cam groove 41R positioned therebehind in the optical axis direction that are regarded as a pair of cam grooves. The formation space for the first supplemental cam groove 47 on the cam ring 40 can be relatively small since only one first supplemental cam groove 47 that supplements the rear cam groove 41R which includes the groove-omitted portion 41R-E is sufficient for the cam mechanism. In addition, although the first supplemental cam groove 47 intersects an adjacent front cam groove 41F in the second embodiment of the zoom lens, it is possible to omit the second supplemental cam groove 48 if the intersection between the first supplemental cam groove 47 and the adjacent front cam groove 41F does not exist.

Although the present invention has been discussed based on the above illustrated embodiments, the present invention is not limited solely to these particular embodiments. For instance, although the six inner cam grooves 29b (the three front cam grooves CF and the three rear cam grooves CR) and the six cam followers 32a (the three front cam followers NF and the three rear cam followers NR) are provided as three groups of cam grooves (three groups of cam followers) which are formed at different positions in a circumferential direction of the cam ring 29, and the six cam grooves 41 (the three front cam grooves 41F and the three rear cam grooves 41R) and the six cam followers 43 (the three front cam followers 43F and the three rear cam followers 43R) are provided as three groups of cam grooves (three groups of cam followers) which are formed at different positions in a circumferential direction of the cam ring 40 in the above illustrated embodiments, the number of groups of cam grooves formed on the cam ring and the corresponding number of groups of associated cam followers are optional.

Although the cam ring 29 (40) is advanced forward while rotating, and the second lens group moving frame 32 (the lens moving frame 42), which is a driven member driven by the cam ring 29 (40), is guided linearly in the optical axis direction in the above illustrated embodiments, it is also possible that the cam ring be provided as an irrotational member and that the driven member be provided as a rotating/advancing member which is moved in the optical axis direction while rotating relative to the irrotational cam ring.

Furthermore, in the transition state when the zoom lens 10 moves from the lens barrel accommodated state (retracted state) to the ready-to-photograph state (wide-angle extremity), the front cam followers (NF, 43F) pass through the wide-width sections (CF-M, 41-M) of the front cam grooves (CF, 41F) and the rear cam followers (CR, 43R) disengage from the rear cam grooves (CR, 41R); however, both the front and rear cam grooves can be formed to have wide-width sections so that both the front and rear cam followers pass through these wide-width sections in the transition state.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cam mechanism of a retractable zoom lens which can move to a ready-to-photograph state which enables a zoom optical system to perform a photographing operation, a retracted state to accommodate said zoom optical system, and a transition state between said ready-to-photograph state and retracted state, wherein said cam mechanism comprises:

a cam ring having cam grooves on a peripheral surface of said cam ring; and a driven member which includes cam followers respectively engaged in said cam grooves, said driven member supporting at least a part of said zoom optical system, and wherein said driven member is supported to be movable relative to said cam ring in an optical axis direction, said cam mechanism moving said driven member forward and rearward in said optical axis direction via engagement of said cam followers with said cam grooves in accordance with relative rotation between said driven member and said cam ring, wherein at least one front cam groove and at least one rear cam groove constitute said cam grooves and are formed at different positions at least in said optical axis direction, said front and rear cam grooves having substantially the same reference cam diagram, being formed in a manner such that a front part of said front cam groove and a rear part of said rear cam groove are omitted from said reference cam diagram, and said front and rear cam grooves having at least one front end opening and at least one rear end opening on a front end surface and a rear end surface of said cam ring, respectively, wherein at least one front cam follower and at least one rear cam follower constitute said cam followers and are engaged in said front cam groove and said rear cam groove, respectively, said front and rear cam followers being formed on said driven member at different positions in said optical axis direction, wherein said front cam follower is disengaged from said front cam groove while said rear cam follower is engaged in said rear cam groove when said driven member is positioned at a limit of forward movement thereof, and said rear cam follower is disengaged from said rear cam groove while said front cam follower is engaged in said front cam groove when said driven member is positioned at a limit of rearward movement thereof, wherein each of said front and rear cam grooves include a normal-width section for guiding an associated said cam follower with substantially no play, and a wide-width section, which is greater in width than said normal-width section, in which said associated cam follower is loosely engageable therein, wherein, when said retractable zoom lens is set at said ready-to-photograph state, one of said front and rear cam followers is engaged in said normal-width section of one associated said cam groove, and the other of said front and rear cam followers is positioned out of said normal-width section of said other associated said cam groove, and wherein, when said retractable zoom lens is set at said transition state, both said front and rear cam followers are positioned out of said normal-width sections of said associated cam grooves so that at least one of said front and rear cam followers is loosely engaged in said wide-width section of said one associated cam groove.

2. The cam mechanism of the retractable zoom lens according to claim 1, wherein when said zoom lens is set at said retracted state, both said front and rear cam followers are loosely engaged in said wide-width sections of said associated cam grooves.

3. The cam mechanism of the retractable zoom lens according to claim 1, wherein when said zoom lens is set at said retracted state, one of said front and rear cam followers is engaged in said normal-width section of said one associated cam groove and the other of said front and rear cam followers is disengaged from said other associated cam groove through an associated end opening.

4. The cam mechanism of the retractable zoom lens according to claim 1, wherein said zoom lens comprises a plurality of stepwise focal lengths within said ready-to-photograph state which are predetermined to stop said cam ring in a stepwise manner, wherein at least one of said front and rear cam grooves includes a width transition portion within a zoom section thereof which connects said normal-width section and said wide-width section, and wherein a rotation of said cam ring is controlled so that each of said front and rear cam followers does not stop at said width transition portion of said associated cam groove in a state where said zoom lens is set at any one of said stepwise focal lengths.

5. The cam mechanism of the retractable zoom lens according to claim 1, wherein said cam ring comprises a plurality of groups of said front and rear cam grooves which are located at different positions in a circumferential direction of said cam ring, and wherein said driven member comprises a plurality of groups of said front and rear cam followers which are located at different positions in a circumferential direction of said driven member.

6. The cam mechanism of the retractable zoom lens according to claim 1, wherein said front end opening of said front cam groove, which is formed on said front end surface of said cam ring, is formed by said wide-width section of said front cam groove, and wherein said rear end opening of said rear cam groove, which is formed on said rear end surface of said cam ring, is formed by said wide-width section of said rear cam groove.

7. The cam mechanism of the retractable zoom lens according to claim 1, wherein said cam ring comprises at least one supplemental cam groove which has a same reference cam diagram as those of said front and rear cam grooves and is formed at a different position from those of said front and rear cam grooves both in said optical axis direction and a circumferential direction of said cam ring.

8. The cam mechanism of the retractable zoom lens according to claim 7, wherein said cam ring comprises a cam-groove omitted portion formed on a peripheral surface of said cam ring, wherein no part of one of said front and rear cam grooves exists in said cam-groove omitted portion even though said reference cam diagram of said one of said front and rear cam grooves passes through said cam-groove omitted portion, and wherein, when one of said front and rear cam followers which is associated with said one of said front and rear cam grooves is positioned in said cam-groove omitted portion, a supplemental cam follower formed on said driven member which is different from said one of said front and rear cam follower is engaged in said supplemental cam groove.

9. The cam mechanism of the retractable zoom lens according to claim 8, wherein said supplemental cam groove comprises an intersecting portion at which said supplemental cam groove intersects said one of said front and rear cam grooves, and wherein said cam ring comprises a second supplemental cam groove for guiding a second supplemental cam follower formed on said driven member which is different from said supplemental cam follower, said second supplemental cam follower being engaged in said second supplemental cam groove when said one of said front and rear cam followers, which is engaged in said one of said front and rear cam grooves, passes through said intersecting portion.

10. The cam mechanism of the retractable zoom lens according to claim 1, wherein said front and rear cam grooves are formed as a continuous cam groove and a discontinuous cam groove, respectively.

11. The cam mechanism of the retractable zoom lens according to claim 1, wherein said zoom optical system comprises a plurality of movable lens groups movable in said optical axis direction while changing a distance therebetween by rotation of said cam ring, said driven member holding at least one of said plurality of movable lens groups.

12. A cam mechanism of a zoom lens comprising:
a cam ring having cam grooves on a peripheral surface of said cam ring; and
a driven member which includes cam followers respectively engaged in said cam grooves, said driven member supporting at least a part of a zoom optical system, and wherein said driven member is supported to be movable relative to said cam ring in an optical axis direction, said cam mechanism moving said driven member forward and rearward in said optical axis direction via engagement of said cam followers with said cam grooves in accordance with relative rotation between said driven member and said cam ring, wherein at least one front cam groove and at least one rear cam groove constitute said cam grooves and are formed at different positions both in said optical axis direction and a circumferential direction of said cam ring, said front and rear cam grooves having substantially the same reference cam diagram, being formed in a manner such that a front part of said front cam groove and a rear part of said rear cam groove are omitted from said reference cam diagram, said front and rear cam grooves having at least one front end opening and at least one rear end opening on a front end surface and a rear end surface of said cam ring, respectively, wherein at least one front cam follower and at least one rear cam follower constitute said cam followers and are engaged in said front cam groove and said rear cam groove, respectively, said front and rear cam followers being formed on said driven member at different positions both in said optical axis direction and said circumferential direction, wherein said front cam follower is disengaged from said front cam groove while said rear cam follower is engaged in said rear cam groove when said driven member is positioned at a limit of forward movement thereof, and said rear cam follower is disengaged from said rear cam groove while said front cam follower is engaged in said front cam groove when said driven member is positioned at a limit of rearward movement thereof, wherein each of said front cam groove and said rear cam groove includes a normal-width section for guiding an associated cam follower with substantially no play and a wide-width section which is greater in width than said normal-width section so that each of said front cam follower and said rear cam follower is loosely engaged therein, and wherein, when zoom lens is set at a ready-to-photograph state, one of said front and rear cam followers is engaged in said normal-width section of an associated cam groove, and the other of said front and rear cam follower is positioned out of said normal-width section of said other associated cam groove.

* * * * *